(12) United States Patent
Sheikh

(10) Patent No.: US 7,831,341 B2
(45) Date of Patent: Nov. 9, 2010

(54) NAVIGATION SYSTEM AND METHOD USING MODULATED CELESTIAL RADIATION SOURCES

(75) Inventor: Suneel Sheikh, College Park, MD (US)

(73) Assignee: University of Maryland, College Park, MD (US)

( * ) Notice: Subject to any disclaimer, the term of this patent is extended or adjusted under 35 U.S.C. 154(b) by 778 days.

(21) Appl. No.: 11/659,199

(22) PCT Filed: Jul. 6, 2005

(86) PCT No.: PCT/US2005/024121

§ 371 (c)(1),
(2), (4) Date: Feb. 2, 2007

(87) PCT Pub. No.: WO2007/008195

PCT Pub. Date: Jan. 18, 2007

(65) Prior Publication Data

US 2009/0018762 A1    Jan. 15, 2009

(51) Int. Cl.
*G05D 1/12* (2006.01)
(52) U.S. Cl. .............................. 701/13; 701/3; 701/200
(58) Field of Classification Search ................ 701/200, 701/204, 214, 220; 342/385–399, 361–364
See application file for complete search history.

(56) References Cited

U.S. PATENT DOCUMENTS

| | | | |
|---|---|---|---|
| 3,714,432 A | 1/1973 | Jalink, Jr. | |
| 3,737,790 A | 6/1973 | Brown | |
| 3,793,518 A | 2/1974 | Harper | |
| 3,825,754 A | 7/1974 | Cinzori et al. | |
| 3,834,653 A | 9/1974 | Perkel | |
| 3,920,994 A | 11/1975 | Cargille | |
| 3,940,753 A | 2/1976 | Muller | |
| 4,056,738 A | 11/1977 | Gustafson | |
| 4,088,906 A | 5/1978 | Huellwegen | |
| 4,119,918 A | 10/1978 | Moser | |
| 4,155,007 A | 5/1979 | Beckmann | |
| 4,263,555 A | 4/1981 | Hunka | |

(Continued)

OTHER PUBLICATIONS

W.G. Melbourne, "Navigation Between the Planets", Scientific American, vol. 234, No. 6, Jun. 1976, pp. 58-74.

(Continued)

*Primary Examiner*—Khoi Tran
*Assistant Examiner*—Stephen Holwerda
(74) *Attorney, Agent, or Firm*—Rosenberg, Klein & Lee

(57) ABSTRACT

A system and method for navigation utilizes sources of modulated celestial radiation. A spacecraft, satellite, or other vehicle (12) includes one or more modulated radiation sensors (22a-22x) for detecting a modulated signal (14) generated by one or more pulsars or other celestial objects (16). Pulse time of arrival at a respective pulse sensor (22a-22x) is measured by comparing the pulse signal (14) with a known pulse profile. A processor (30) calculates a timing difference between the measured pulse time of arrival at sensor (22a-22x) with a calculated pulse time of arrival at a selected reference point (100). Positions and pulse profile characteristics of the pulsars (16) are stored. Combining the calculated time difference with the known positions of pulsars (16), navigational parameters such as position, velocity, and attitude for spacecraft (12) with respect to the selected localized reference point (100) can be calculated.

16 Claims, 8 Drawing Sheets

U.S. PATENT DOCUMENTS

| | | | |
|---|---|---|---|
| 4,426,591 A | | 1/1984 | Cargille |
| 4,618,259 A | * | 10/1986 | Czichy et al. .......... 356/139.01 |
| 4,992,675 A | | 2/1991 | Conner, Jr. et al. |
| 6,622,970 B2 | * | 9/2003 | Guo ........................... 244/168 |
| 7,197,381 B2 | | 3/2007 | Sheikh et al. |
| 2005/0192719 A1 | * | 9/2005 | Sheikh et al. ................. 701/13 |

OTHER PUBLICATIONS

J.F. Jordan, "Navigation of Spacecraft on Deep Space Missions", Journal of Navigation, vol. 40, Jan. 1987, pp. 19-29.

C.J. Weeks, et al., "Analytical Models of Doppler Data Signatures", paper AAS 94-178, Advances in Astronautical Sciences, vol. 87, No. 2, 1994.

R. Gounley, et al. "Autonomous Satellite Navigation by Stellar Refraction", Journal of Guidance and Control, vol. 7, No. 2, Mar.-Apr. 1984, pp. 129-134.

D.C. Folta, et al. Autonomous Navigation Using Celestial Objects:, paper AAS 99-439, presented at the American Astronautical Society Astrodynamics Specialist Conference, Aug. 1999, pp. 2161-2177.

G.S. Downs, "Interplanetary Navigation Using Pulsating Radio Sources" NASA Technical Reports N74-34150, Oct. 1, 1974, pp. 1-12.

Kevin Wallace, "Radio Stars, What They Are and the Prospects for Their Use in Navigational System", Journal of Navigation, vol. 41, Sep. 1988, pp. 358-374.

T.J. Chester, et al., "Navigation Using X-Ray Pulsars" NASA Technical Reports N81-27129, Jun. 15, 1981, pp. 22-25.

K.S. Wood, "Navigation Studies Utilizing the NRL-801 Experiment and the Argos Satellite", Small Satellite Technology and Applications III, Ed. B.J. Horais, SPIE Proceedings, vol. 1940, 1993, pp. 105-116.

John Eric Hanson, "Principles of X-Ray Navigation", Doctoral Dissertation, Stanford University, Mar. 1996.

K.S. Wood, et al., "The USA Experiment on the Argos Satellite: A Low Cost Instrument for Timing X-Ray Binaries", EUV, X-Ray, and Gamma-Ray Instrumentation for Astronomy V, Eds. O.H. Siegmund & J.V. Vallerga, SPIE Proceedings, vol. 2280, 1994, p. 19.

K.S.Wood, et al., "The USA Experiment on the Argos Satellite: A Low Cost Instrument for Timing X-Ray Binaries", The Evolution of X-ray Binaries, Eds. S.S. Holt and C.S.Day, American Institute of Physics Proceedings, No. 308, 1994, p. 561-564.

P.S. Ray, et al., The USA X-Ray Timing Experiment:, American Institute of Physics Conference Proceedings, vol. 599, 2001, p. 336.

G.S. Downs, et al., "Techniques for Measuring Arrival Times of Pulsar Signals I: DSN Observations From 1968 to 1980", NASA Technical Reports N80-33317, Aug. 15, 1980, pp. 1-80.

J.H. Taylor et al., "Recent Progress in the Understanding of Pulsars", Annual Review of Astronomy and Astrophysics, vol. 24, 1986, pp. 285-327.

P.S. Ray, et al., "Absolute Timing of the Crab Pulsar: X-Ray, Radio, and Optical Observations", American Astronomical Society Meeting #201, Dec. 2002.

P.S. Ray, et al., "Absolute Timing of the USA Experiment Using Pulsar Observations", American Astronomical Society, HEAD Meeting #35, Mar. 2003.

K.S. Wood, et al., "The HEAO A-1 X-Ray Source Catalog", Astrophysical Journal Supplemental Series, vol. 56, Dec. 1984, pp. 507-649.

W. Voges, et al., The Rosat All-Sky Survey Bright Source Catalogue (1RXS), Astronomy and Astrophysics, vol. 349, 1999, pp. 389-405.

W. Voges, et al., The Rosat All-Sky Survey Faint Source Catalogue, International Astronomical Union Circular 7432, May 2000.

R.N. Manchester, et al., "The Parkes Multi-Beam Pulsar Survey", Monthly Notices of the Royal Astronomical Society, vol. 328, 2001, pp. 17-35.

G.B. Hobbs, et al. "A New Pulsar Catalog", to be published in the Astronomical Journal.

J.H. Taylor, et al., "Catalog of 558 Pulsars", Astrophysical Journal Supplemental Series, vol. 88, 1993, pp. 529-568.

D.N. Matsakis, et al., "A Statistic for Describing Pulsar and Clock Stabilities", Astronomy and Astrophysics, vol. 326, 1997, pp. 924-928.

V. M. Kaspi, et al., High-Precision Timing of Millisecond Pulsars. III.Long-Term Monitoring of PSRS B1855+09 and B1937+21, Astrophysical Journal, vol. 428, Jun. 1994, pp. 713-728.

A.G. Lyne, et al., "Jodrell Bank Crab Pulsar Timing Results, Monthly Ephemeris", University of Manchester, Aug. 13, 2002 Unpubished.

J.H. Taylor, "Pulsar Timing and Relativistic Gravity", Philosophical Transactions Royal Society of London, vol. 341, 1992, pp. 117-134.

R.W. Hellings, "Relativistic Effects in Astronomical Timing Measurements", Astronomical Journal, vol. 91, No. 3, Mar. 1986, pp. 650,659.

Theodore D. Moyer, "Transformation From Proper Time on Earth to Coordinate Time in Solar System Barycentric Space-Time Frame of Reference, Part 1", Celestial Mechanics, vol. 23, 1981, pp. 33-56.

Theodore D. Moyer, "Transformation From Proper Time on Earth to Coordinate Time in Solar System Barycentric Space-Time Frame of Reference, Part 2", Celestial Mechanics, vol. 23, 1981, pp. 57-68.

J. B. Thomas, "Reformulation of the Relativistic Conversion Between Coordinate Time and Atomic Time", Astronomical Journal, vol. 80, No. 5 , May 1975, pp. 405-411.

D.C. Backer, et al., "Pulsar Timing and General Relativity", Annual Review of Astronomy and Astrophysics, vol. 24, 1986, pp. 537-575.

P. Stumpff, "On the Computation of Barycentric Radial Velocities With Classical Perturbation Theories", Astronomy and Astrophysics, vol. 56, 1977, pp. 13-23.

P. Stumpff, "The Rigorous Treatment of Stellar Aberration and Doppler Shift, and the Barycentric Motion of the Earth", Astronomy and Astrophysics, vol. 78, 1979, pp. 229-238.

Duncan R. Lorimer, "Binary and Millisecond Pulsars at the New Millennium", Living Review in Relativity, Max Planck Institute for Gravitational Physics, Albert Einstein Institute, Germany, Jun. 2001.

C.F. Martin et al. "Relativistic Effects on an Earth-Orbiting Satellite in the Barycenter Coordinate System", Journal of Geophysical Research, vol. 90, No. B11, Sep. 1985, pp. 9403-9410.

Clifford M. Will et al., "Conservation Laws and Preferred Frames in Relativistic Gravity. I. Preferred-Frame Theories and Extended PPN Formalism", Astrophysical Journal, vol. 177, Nov. 1972, pp. 757-774.

K. Nordtvedt, Jr., et al., "Conservation Laws and Preferred Frames in Relativistic Gravity. II. Experimental Evidence to Rule Out Preferred-Frame Theories of Gravity", Astrophysical Journal, vol. 177, Nov. 1972, pp. 775-792.

Gary W. Richter, et al., "Second-Order Contributions to Relativistic Time Delay in the Parameterized Post-Newtonian Formalism", Physical Review D, vol. 28, No. 12, Dec. 1983, pp. 3006-3012.

Neil Ashby et al., "Coordinate Time on and Near the Earth", Physical Review Letters, vol. 53, No. 19, Nov. 1984, p. 1858.

Irwin I. Shapiro, "Fourth Test of General Relativity", Physical Review Letters, vol. 13, No. 26, Dec. 1964, pp. 789-791.

L. A. Rawley et al., "Fundamental Astrometry and Millisecond Pulsars", Astrophysical Journal, vol. 326, Mar. 1988, pp. 947-953.

V.M. Kaspi, "High-Precision Timing of Millisecond Pulsars and Precision Astrometry", Proceedings of 166th Symposium of the International Astronomical Union, Eds. E. Hog and P. Kenneth Seidelmann, Aug. 1994, pp. 163-174.

J.F. Bell, "Radio Pulsar Timing", Advances in Space Research, vol. 21, No. 1/2, 1998, pp. 137-147.

J.H. Taylor et al., "Further Experimental Tests of Relativistic Gravity Using the Binary Pulsar PSR 1913+16", Astrophysical Journal, vol. 345, Oct. 1989, pp. 434-450.

Roger Blandford, et al., "Arrival-Time Analysis for a Pulsar in a Binary System", Astrophysical Journal, vol. 205, Apr. 1976, pp. 580-591.

Sergei M. Kopeikin, "Millisecond and Binary Pulsars As Nature's Frequency Standards-II. The Effects of Low-Frequency Timing Noise on Residuals and Measured Parameters", Monthly Notices of the Royal Astronomical Society, vol. 350, 1999, pp. 563-590.

P. Kenneth Seidelmann, Ed., Explanatory Supplement to the Astronomical Almanac, University Science Books, 1992, Portion of Chapter 2.

Stimets et al., The celestial view from a relativistic starship, Journal British Interplanetary Society, v 34 p. 83-99 (from Dialog(R) File 14, acc. No. 0000130609).

Markley et al., Attitude control system of the Wilkinson Microwave Anisotropy Probe, NASA Goddard Space Flight Center, Greenbelt, Maryland 20771, Journal of guidance, control, and dynamics, 2005, 28(3) (from Dialog(R) File 144, acc. No. 17204032 Pascal No. 05-0275169).

Hoag et al., Navigation and guidance in interstellar space, Journal Acta Astronautica vol. 2 No. 5-6, p. 513-33, May-Jun. 1975 (from Dialog(R) File 2, acc. No. 01851172).

Walker et al., AFCRL Infrared sky survey, vol. 1—Catalog of Observation s at 4, 11, and 20 Microns, Report No. AFCRL-TR-75-0373, AFCRL-ERP-522, (from Dialog(R) File 6, acc. No. 0523586 NTIS Accession No. AD-A016397/2/XAB).

Farthing et al., Device for determining relative angular position between a spacecraft and a radiation emitting celestial body, Report No. NASA-CASE-GSC-11444-1; Patent-3 744 913, Filed Patented Jul. 10. 1973, 9P. (from Dialog(R) file 6, acc. No. 0403630).

Sheikh, The use of variable celestial X-ray sources for spacecraft navigation, University of Maryland Thesis, College Park 2005, Dialog(R) file 35, acc. No. 02103188).

Schultz et al., UMBRAS—a matched occulter and telescope for imaging extrasolar planets, SPIE Proceeding Series, v SPIE-4860, p. 54-61, 2003 (from Dialog(R) file 57, Acc. No. 0000271820).

Harmon et al., Optical trackers in space, Journal of Society of America, v9 n11 Nov. 1962 (from Dialog(R) File 8, acc. No. 0001546732 E.I. No. 19630034466).

* cited by examiner

NAVIGATION SYSTEM AND METHOD USING MODULATED CELESTIAL RADIATION SOURCES

BACKGROUND OF THE INVENTION

1. Field of the Invention

The subject invention relates to a system and method for determining the absolute and relative position, velocity and attitude of a vehicle, such as a spacecraft or a terrestrial vehicle, utilizing modulated radiation emitted by various celestial sources. In particular, the present invention directs itself to a mobile receiver for detecting signals generated by celestial sources of modulated radiation. The mobile receiver may be mounted on a spacecraft, satellite, planetary rover, or other vehicle, and the received signal is used to calculate navigational data for the vehicle. More particularly, this invention directs itself to a clock or timer in communication with the mobile receiver for generating a timing signal corresponding to the reception and detection of the modulated celestial radiation. The timing signal is used to calculate a time difference between predicted and measured reception of the timing signal at the mobile receiver. Incorporating predetermined models of the modulated celestial radiation arrival times within an inertial reference frame, navigational data, such as a position offset of the mobile receiver, is then be determined from the time difference.

Further, the mobile receiver is in communication with a digital memory system. The digital memory system stores information including the positions and pulse timing model parameters of known sources of modulated celestial radiation with respect to the chosen inertial reference frame. Further, this invention directs itself to a navigational system including a processing means for calculating navigational data for spacecraft, satellite, planetary rover, or vehicle based upon the calculated time difference in combination with the known positional and timing model data of the sources of celestial radiation stored within the digital memory system.

Additionally, the invention directs itself to a navigational system and method allowing for calculation of either an absolute position of the spacecraft with regard to an absolute reference, or a relative position being calculated with respect to a relative selected position, such as another spacecraft. Further, the processing means allows for the calculation of error correction data which may be applied to the computed navigational data. Errors due to relativistic effects are also computed and corrected for.

2. Description of the Prior Art

Celestial objects, or sources, have been utilized throughout history as navigational aids. The motions of the Sun, Moon, and planets, as observed from the Earth's surface, have provided the concept of time, and are a form of a celestial clock. Using catalogued almanac information, the observation of visible stars have provided travelers on the Earth a means to determine position information relative to observation stations fixed on the Earth. As these methods have matured over time, and with the addition of instrumented time clocks, or chronometers, the performance of navigation methods has improved.

Navigation of vehicles above and beyond the Earth's surface have benefited from this knowledge of celestial source-based navigation. Satellites orbiting the Earth and spacecraft traveling throughout the Solar System have relied on celestial sources to successfully complete their missions. Additionally, celestial source navigation systems have been augmented with human-made systems to further increase vehicle and spacecraft navigation performance. In fact, a wide variety of methods have been used to compute the navigation information of spacecraft which have traveled around the Earth, through the Solar System, and beyond the Solar System's outer planets, as far as the heliopause.

Navigation of spacecraft is defined as determining the spacecraft's three-dimensional position, velocity, and attitude at a specific time or times. Position determination of near-Earth missions has included the use of ground-based radar and optical tracking, Earth-limb horizon sensors, Sun sensors, and Global Positioning System (GPS) receivers. These sensors use knowledge and observations of celestial objects and phenomena to determine position relative to the Earth. The GPS system produces signals from multiple transmitting satellites that allow a receiver to determine its position from the ranges to the transmitting satellites. Position determination of spacecraft on interplanetary missions has utilized Doppler radar range measurements, standard radio telemetry, and target body imagery. Attitude, or orientation, of spacecraft has typically been determined using magnetometers, gyroscopes, star cameras, star trackers, Earth-limb horizon sensors and Sun sensors. Time has often been determined using an on-board clock on the spacecraft, or through periodic computer updates from ground control stations.

Radar range and tracking systems have been the predominant system for tracking and maintaining continuous orbit information of spacecraft. In order to compute position of spacecraft, radar range systems compute the range, range-rate, and/or the angular orientation angles to the spacecraft relative to the radial direction from a radar tracking station to the spacecraft. This is achieved primarily through the reflection of signals transmitted from an Earth observing station by the space vehicle structure and measurement of the transmitted signal round-trip time. Although this system requires no active hardware on the spacecraft itself, it does require an extensive ground tracking system and careful analysis of the measured data against an electromagnetically noisy background environment. Using the best known position of the observing station and processing multiple radar measurements, the vehicle's orbit parameters can be computed. The position of the vehicle can be propagated analytically ahead in time using standard orbital mechanics along with known models of Solar System object's gravitational potential field; as well as any known disturbance or perturbations effects, such as object body atmospheric drag. This propagated navigation solution is then compared to subsequent radar measurements and the navigation solution is collected for any determined errors. This process continues until a navigation solution converges to within the expedition's required parameters. However, vehicle maneuvers or any unaccounted-for disturbances will affect the trajectory of the vehicle. Without exact knowledge of these maneuver dynamics or disturbance effects, it is necessary for the propagation and radar measurement comparison to continue throughout the flight.

As the spacecraft moves further away from Earth observation stations, the error in navigational data increases. To achieve the necessary range determination, the radar system requires knowledge of the observation station's position on the Earth to great accuracy. With sophisticated surveying systems, including GPS, such accuracy may be achieved. However, even with this precise knowledge, the position measurement can only be accurate to a finite angular accuracy. The transmitted radar beam, along with the reflected signal, travels in a cone of uncertainty. This uncertainty degrades the position knowledge in the transverse direction of the vehicle as a linear function of distance. As the vehicle gets more distant, any fixed angular uncertainty reduces the knowledge of vehicle position, especially in the two transverse axes relative to the range direction. These axes are along-track of the vehicle's velocity and cross-track, or perpendicular, to the vehicle's velocity and radial direction. Even utilizing interferometry, using the difference between multiple signals compared at two ranging stations, the angular uncertainty rapidly grows above acceptable limits.

Alternatively, many deep space spacecraft have employed active transmitters to be used for navigational purposes. The radial velocity is measured at a receiving station by measuring the Doppler shift in the frequency of the transmitted signal. The spacecraft essentially receives a "ping" from the Earth observation station and re-transmits the signal back to the Earth. Although improvements in the radial direction range and range-rate measurements are made utilizing such system, transverse axes, including along-track and cross-track axes, errors still exist, and this method has errors that also grow with distance.

Optical tracking measurements for spacecraft position and orbit determination are completed in a similar fashion as radar tracking. Optical tracking uses the visible light reflected off a vehicle to determine its location. Some optical measurements require a photograph to be taken and the vehicle's position is calculated after analysis of the photograph and comparison to a fixed star background. Real-time measurements using such systems are typically not easily achieved. Additionally, optical measurements are limited by favorable weather and environmental conditions. Because most missions have been oriented around planetary observation, augmentation to the ranging navigation system can be made within the vicinity of the investigated planet. By taking video images of the planet and comparing to known planetary parameters (such as diameter and position), the video images can determine position of the spacecraft relative to the planet. Since, often the objective is to orbit the planet, only relative positioning is needed for the final phase of the flight and not absolute position.

To aid the position determination process, an accurate clock is a fundamental component to most spacecraft navigational systems. On-board clocks provide a reference for the vehicle to use as its own process timer and for comparison to other time systems. Atomic clocks provide high accuracy references and are typically accurate to within one part in $10^9$-$10^{15}$ over a day. As calculated by Melbourne in "Navigation Between the Planets", *Scientific American*, Vol. 234, No. 6, June 1976, pp. 58-74, in order to track radio signals at accuracies of a few tenths of a meter, a clock with nanosecond accuracy over several hours is needed. This requires the clock to be stable within one part in $10^{13}$. As early chronometers helped improve navigation over the Earth's ocean, more accurate chronometers will help navigation through the solar system.

To gain increased autonomy in spacecraft operation, it is desirable to develop systems other than the operationally intensive human-controlled radar and optical position determination methods. Methods that employ celestial sources, which provide positioning capabilities and do not require labor-intensive operations, remain attractive.

In order to navigate using celestial objects, precise knowledge of their positions relative to a defined reference frame at a selected time epoch is required. Catalogued ephemeris information of Solar System objects provides this reference frame information. The Sun, Moon, and planets all translate within the Solar System in a reference frame viewed from the Earth. Since the orbits of the objects are near-Keplerian, and nearly circular, this translational motion is nearly periodic, repeating after a certain time span elapsed. It is exactly this periodicity that leads to the concept of time. The motion of these objects, or their angular displacement in their orbit, can be interpreted as a clock measuring time.

Although seemingly "fixed" with respect to a frame on the Earth, the visible spectrum stars can also provide a measurement of time and, therefore, can be interpreted as a navigational reference. In this case, however, it is the Earth or spacecraft that provides the time measurement, by rotating or translating with respect to the fixed background of stars. The extremely large distances to the stars in the Milky Way galaxy and other galaxies essentially create the illusion that the stars are fixed. Just as the Solar System rotates, however, so does the Milky Way rotate and the Galaxy translates with respect to neighboring galaxies. Thus, objects are continually speeding away and towards the Earth at all times. However, the motion of the stars is so slow compared to many other measurements of time that this motion is perceived as fixed.

In addition to providing a measure of time, just as humans "triangulate" their Earth position relative to identifiable landmarks, it is conceivable to use persistent star light as markers for triangulating position. Observing known stars allows a spacecraft to initially estimate its orientation and begin a process of determining its position relative to another object. However, due to the large number of visible stars, detecting specific stars can be time-consuming due to necessary almanac database searches. Also, since there is no method of determining "when" the visible light was sent from the stars and because the stars are located so far away, determining range information from an individual star to help "triangulate" a spacecraft's position is problematic. Only during the instance of occultation, or when a known celestial body passes in front of a selected star while it is being viewed, allows a dependable method of position determination directly from star light.

However, individual stars that do have a uniquely identifiable signal, for example, whose signals are periodic, can be utilized directly as celestial sources for navigation purposes.

Astronomical observations have revealed several classes of celestial objects that produce unique signals. A particularly unique and stable signal is generated by pulsars. It is theorized that pulsars are rotating neutron stars, which are formed when a class of stars collapse. Conservation of angular momentum asserts that, as the stars become smaller, or more compact, they rotate faster. Neutron stars rotate with periods ranging from 1.5 ms to thousands of seconds. A unique aspect of this rotation is that for certain classes of pulsars, the rotation can be extremely stable, providing thereby a stable source of radiation modulated by the neutron star's rotation. The most stable pulsars have stabilities on the order of $10^{-14}$ when measured on time scales of a year, which is comparable to the best terrestrial atomic clocks. No two neutron stars have been formed in exactly the same manner, thus their periodic signatures are unique. Because pulsars provide signals that are unique, periodic and extremely stable, they can assist in navigation by providing a method to triangulate position from their signals. Pulsars can be observed in the radio, optical, X-ray, and gamma-ray ranges of the electromagnetic spectrum. They exist as isolated neutron stars or components of multiple star systems. Several classes of high and low mass binary companions exist for pulsar stars. The cyclic eclipsing of a pulsar by its binary companion provides a secondary periodic signal from these sources.

Downs, in "Interplanetary Navigation Using Pulsating Radio Sources", *NASA Technical Reports*, N74-34150, Oct. 1, 1974, pp. 1-12, presented a method of navigation for orbiting spacecraft based upon radio signals from a pulsar. However, both the radio and optical signatures from pulsars have limitations that reduce their effectiveness for spacecraft missions. In order to be effective, optical pulsar-based navigational systems would require a large aperture to collect sufficient photons, since few pulsars exhibit bright optical pulsations. To date there are only five pulsars that have been observed to emit pulsed visible radiation. This small number of sources severely limits the options for an optical-based variable source navigation system. The large number of fixed radiation visible sources requires precise pointing and significant processing to detect pulsars in the presence of bright neighboring objects. This is not attractive for vehicle design. At the radio frequencies which pulsars emit (~100 MHz-few GHz) and with their faint emission, large antennae (likely 25 m in diameter or larger) would be required, which would be impractical for most spacecraft. Also, neighboring celestial objects, including the Sun, Moon, close stars, and Jupiter, as well as distant objects, such as supernova remnants, radio galaxies, quasars, and the galactic diffuse emissions are broadband radio sources that could obscure the weak pulsar radio signals, as shown by Wallace in "Radio Stars, What They Are and The Prospects for Their Use in Navigational System", *Journal of Navigation*, Vol. 41, September 1988, pp. 358-374. The low radio signal intensity from pulsars would require long signal integration times for an acceptable signal to noise ratio.

Chester and Butman in "Navigation Using X-Ray Pulsars", *NASA Technical Reports*, N81-27129, Jun. 15, 1981, pp. 22-25, propose the use of pulsars emitting in the X-ray band as a better option for navigation. Antennae on the order of 0.1 $m^2$ could be used for X-ray detection, which is much more reasonable than a large radio antenna. Additionally, there are fewer X-ray sources to contend with and many have unique signatures, which do not get obscured by closer celestial objects. One complicating factor is that many X-ray sources are transient in nature. The transient sources are only detectable at irregular intervals as a result of a modulation in the accretion rate onto the celestial source. Typically, the "steady" sources (such as many of the rotation-powered pulsars) would be used for navigation. By cataloging pulsar positions and recording their signal periodicity and identifying parameters, as well as the data from other types of modulated celestial radiation sources, a table of candidate stars can be created for use in navigation. These catalogs can then be stored in data memory format for use by algorithm processes onboard vehicles that detect modulated radiation signals. Maintenance of these catalogs, and timely dissemination of data updates, is required for a high performance navigation system.

SUMMARY OF THE INVENTION

The present invention provides for a system and method for calculating navigational data utilizing modulated celestial sources. In accordance with aspects of the invention, a method for determining navigational data using modulated celestial radiation first selects a localized reference point in a reference frame. Modulated radiation from at least one celestial source is received at a reception point located in the reference frame, where the reception point is located an unknown distance away from the reference point. Each source is located along a line in a known direction with respect to the reference point. A signal is generated for each source from the received modulated radiation, where each signal is characterized by a modulation characteristic of the corresponding source. A time of arrival signal is generated corresponding to each source, where the time of arrival signal indicates a coordinate time of reception of a first state of the modulation characteristic of each signal. The time of arrival signals are used to estimate a second state of the modulation characteristic, which corresponds to the state of the modulation characteristic at the reference point and at the coordinate time of reception of the first state. At least one navigational parameter at the reception point relative to the reference point is determined from the first and second states of the modulation characteristic.

In another aspect of the invention, a method is provided for determining navigational data using modulated celestial radiation selects a localized reference point in a reference frame and provides a timer at a displaceable reception point in the reference frame. The timer generates a timing signal indicative of a proper time of reception of a modulation characteristic of modulated radiation. Modulated radiation is received at the reception point from at least one celestial source located along a line in a known direction with respect to the reference point. At least one signal is generated from said modulated radiation, where the signal is characterized by a corresponding modulation characteristic of a corresponding source. Time of arrival signals are generated by the timer responsive to the detection of the modulation characteristic of each signal. The time of arrival signals are transferred to the reference point to produce corresponding coordinate time of arrival signals. The coordinate time of arrival signals are used to estimate coordinate times of arrival of the corresponding modulation characteristic at the reference point. Navigational parameters relative to the reference point are determined from the coordinate time of arrival signals In another aspect of the invention, a navigation system is provided, which includes a displaceable receiver located at an unknown distance from a predetermined reference point. The receiver is operable to detect modulated radiation generated by at least one celestial source thereof, where each source is located along a line in a known direction with respect to the reference point. The receiver provides a signal corresponding to each source that is characterized by a known modulation characteristic of said modulated radiation. The system further includes a timer in communication with the displaceable receiver and that is operable to generate at least one time of arrival signal corresponding to each source. Each time of arrival signal is indicative of a time of detection of the characteristic of a corresponding one of the signals. A processor is provided to be in communication with the timer and that is operable to compute at least one navigational parameter from the at least one time of arrival signal.

DESCRIPTION OF THE PREFERRED EMBODIMENTS

I. Overview

The present invention is now described with reference to the Drawings. In the Figures, like elements are annotated with like numerals and descriptors.

Figure 1:
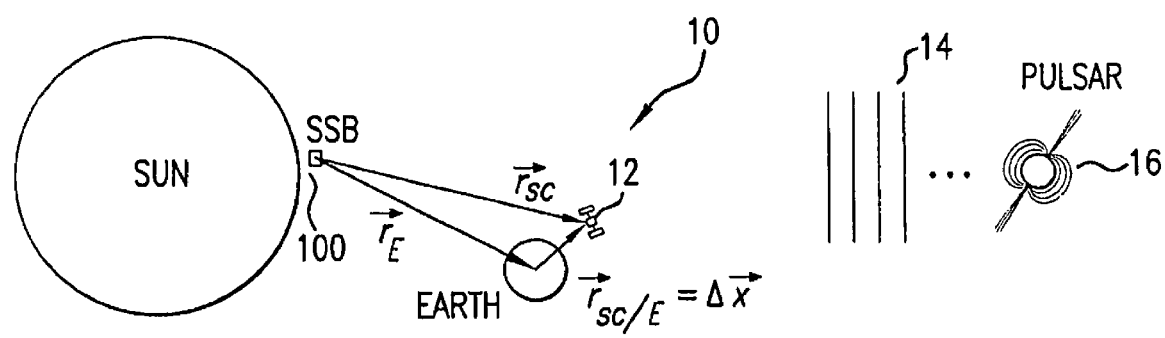
FIG. 1 is a schematic view of an exemplary system for navigation utilizing sources of pulsed celestial radiation in accordance with the present invention.

Referring to FIG. 1, there is illustrated an exemplary system 10 for absolute and relative position determination using celestial radiation sources in accordance with the present invention. As used herein, a "celestial source" refers to a natural (not man-made) celestial body emitting radiation.

As is shown in the Figure, a spacecraft, satellite or other vehicle 12 is positioned near Earth within the Solar System, as indicated by the position vector $\bar{r}_{SC/E}$. The location of the Earth relative to the Solar System Barycenter (SSB) is $\bar{r}_E$ and the location of the spacecraft 12 relative to the SSB is $\bar{r}_{SC}$. The spacecraft 12 is operable to receive modulated radiation, such as pulsed radiation 14, generated by a celestial body, such as pulsar 16. The modulated radiation is subsequently used to generate navigational information, as is described more fully below.

It is to be noted that, while many of the exemplary embodiments are described with reference to extraterrestrial vehicles, such as spacecraft, the navigation methods of the present invention may be applied to planetary-bound vehicles as well.

Figure 11:
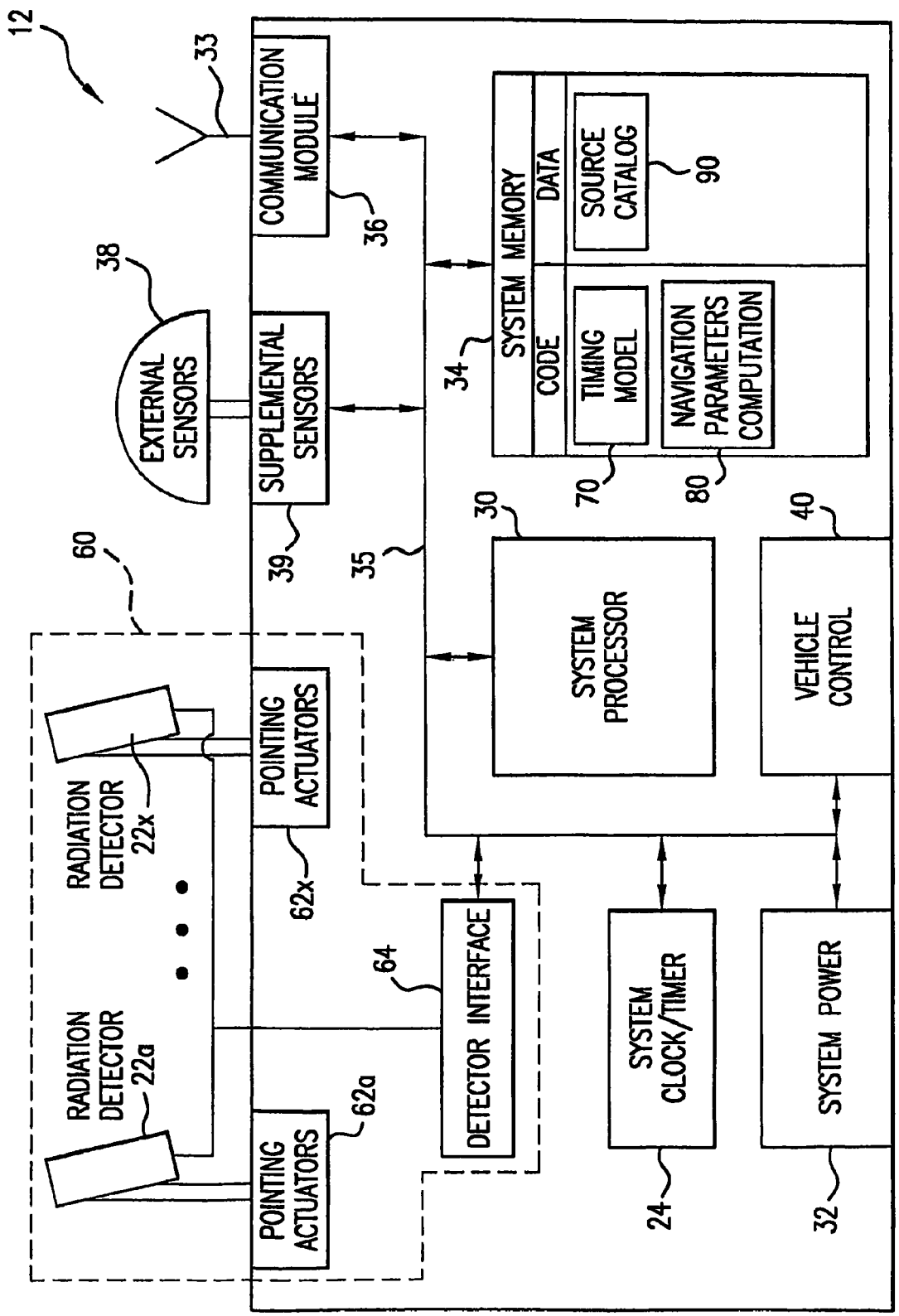
FIG. 11 is a schematic diagram illustrating the navigational system mounted on a spacecraft.

In accordance with certain aspects of the invention, the spacecraft 12, an exemplary embodiment of which is schematically shown in FIG. 11, includes a receiver 60 having means for detecting the modulated radiation, such as radiation detectors 22*a*-22*x*, for detecting the pulsed radiation 14. In the exemplary embodiment, each radiation detector 22*a*-22*x* is mounted on a respective actuator 62*a*-62*x* for purposes of pointing the corresponding detector towards a particular celestial source. The detectors are coupled to a detector interface 64, which produces radiation profiles for each celestial source, and provides the radiation profile data to processor 30 via bus 35. It should be noted that while the exemplary system of FIG. 11 is illustrated with a plurality of radiation detectors, receiver 60 may be equipped with only a single detector. The radiation profiles from separate celestial sources may be collected in a multiplex fashion, such as by pointing the detector at a first source for a period of time and then pointing the detector at the next source for a period of time.

In certain embodiments, modulated radiation is synchronously integrated over time to produce "folded" profiles, whereas in other embodiments, electromagnetic data are sampled to produce the profile data. It should be apparent that many methods for obtaining the profile data from a celestial source exist and may be used with the present invention.

Known modulation characteristics of celestial sources, such as pulse profiles of known pulsars, are stored in source catalog 90 within memory 34, which is in communication with processor 30. Memory 34 also has stored therein executable code that, when executed by processor 30, conducts a timing model 70 to estimate a state of the modulation characteristic, such as phase, frequency or time of arrival, at a reference location, as will be described in detail below. The memory 34 also stores executable code of various algorithms for computing navigational parameters, as indicated at 80.

As will be discussed further below, comparing the predicted arrival time with the actual measured arrival time of a pulse from a celestial source provides an indication of position, or difference in known position, along the line of sight to that source. The system clock or timer 24 measures the time of receipt and pulse frequency of electromagnetic pulses 14 in order to be compared with the pulse profile stored in source catalog 90. The pulse profiles are compared with corresponding measured timed pulses through algorithms executed by processor 30.

As shown in FIG. 11, the satellite or spacecraft 12 also carries a power supply 32, which may be implemented by, for example, batteries or solar panels, and a vehicle control system 40 for maneuvering the vehicle 12, such as through torque rods, reaction wheels or control jets. The vehicle 12 may by outfitted with external sensors 38, such as an optical star tracking system, GPS receiver and Sun/Earth sensors, and supplemental sensors 39, such as gyroscopes, accelerometers and magnetometers. The external sensors 38 and supplemental sensors 39 provide supplemental data to the vehicle 12 for navigation and other purposes. The vehicle 12 also may, in certain embodiments, include a communications module 36 and associated antenna 33 for contacting and transmitting data to, and receiving data from, other parties such as a terrestrial based command center or another spacecraft.

II. Observables and Errors

Many celestial sources emit modulated radiation that is detectable through known detection methods. As used herein, the term "modulated celestial radiation" refers to celestial radiation of any frequency, or equivalently any wavelength, that exhibits a modulation characteristic, i.e., a variation in amplitude, frequency or phase, where such variation is imposed by some cosmological influence. This concept is exemplified by the theorized operation of pulsars given above, where the cosmological influence is the rotation of the neutron star, the action of which imposes a periodic structure onto the celestial radiation. Regardless of whether or not this theoretical model of pulsar activity is the actual mechanism by which pulsar signals are generated, such definition provides a basis upon which to, at a minimum, describe the present invention in unambiguous terms. That is to say, that whatever cosmological influence is actually responsible for forming the variation in the radiation of an emitting pulsar, the term "modulated celestial radiation" is adequately descriptive of the signal in view of the definition provided above.

Due to the stability of the emission mechanisms of some modulated celestial radiation sources, the arrival time of a state of the periodic radiation is often predictable. In many useful cases, the modulated radiation approximates a periodic pulse train, such as that indicated at 14 in FIG. 1. Thus, for reasons of simplifying the description of the invention, but not to limit the scope thereof, the discussions below will be with reference to pulsed radiation from the celestial sources, unless otherwise indicated. However, it should be clear to the skilled artisan that many other modulation waveforms may be utilized with the present invention through minor changes in a particular implementation thereof.

At sufficiently high energy levels, an individual pulse is a collection of photons emitted and assembled through the radiation modulation mechanisms of the celestial source. However, it should be clear to those skilled in the art upon reviewing this disclosure that radiation at lower energy levels may be used with the invention. For example, certain embodiments of the invention may detect and process radiation at, for example, radio frequencies using technology known in the art. The exemplary embodiments below, however, will be described with respect to quanta of sufficiently high energy levels so as to be detected using technology easily incorporated onto movable vehicles, such as spacecraft.

Each single photon travels along a light ray path, or world line. This world line follows the path of a null geodesic as the photon travels from the emitting source to the receiving location of an observer and is affected by the gravitational influence of nearby bodies. Thus, certain embodiments of the present invention include relativistic effects in the computation of navigation data so as to accurately determine the true path of a photon from the source. The more accurately the path may be determined, the more accurately distance may be determined from the traversal time of photons.

Figure 2:
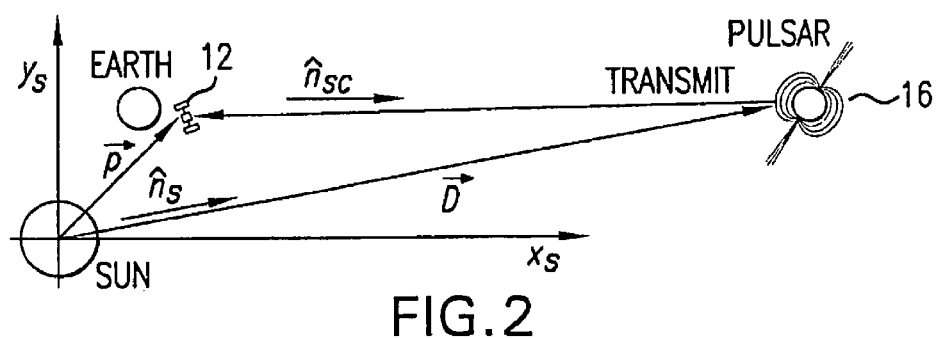
FIG. 2 is a schematic view illustrating a light ray path arriving from a source of pulsed celestial radiation within the Solar System.

Considering a single pulse from a celestial source, the transmission time of one photon is related to the reception, or observed time of the photon by the distance along the path the photon has traveled. FIG. 2 illustrates the applicable geometry of an emitting source 16 and the observation of the photon at spacecraft 12 about Earth. The distance to the source from the Sun is the length of the vector D, the position of the spacecraft 12 relative to the Sun is $\bar{p}$, and the line of sight from the spacecraft 12 to the pulsar 16 is indicated by the unit vector $\hat{n}_{SC}$. A pulse has a characteristic peak of a large number of photons within the periodic cycle thereof. By measuring the arrival times of all the photons within a pulse period, the arrival time of the pulse peak can be determined.

For a pulse arriving in the Solar System, the relationship of the transmission time, $t_T$, to the reception time, $t_{R_{SC}}$ is given by the following:

$$(t_{R_{SC}} - t_T) = \frac{1}{c}\hat{n}_{SC} \cdot (\bar{D} - \bar{p}) - \sum_{k=1}^{P_{SS}} \frac{2GM_k}{c^3} \ln\left|\frac{\hat{n}_{SC} \cdot \bar{p}_k + p_k}{\hat{n}_{SC} \cdot \bar{D}_k + D_k}\right| + \frac{2\mu_S^2}{c^5 D_y^2}\left\{\hat{n}_{SC} \cdot (\bar{D} - \bar{p})\left[\left(\frac{(\hat{n}_{SC} \cdot \bar{D})}{D}\right)^2 + 1\right] + 2(\hat{n}_{SC} \cdot \bar{D})\left[\frac{p}{D} - 1\right] + D_y\left[\arctan\left(\frac{p_x}{D_y}\right) - \arctan\left(\frac{D_x}{D_y}\right)\right]\right\}. \quad (1)$$

The first term on the right hand side of Eq. (1) is the geometric separation between the source 16 and the observer 12. The second term is the summation of Shapiro delay effects of all $P_{SS}$ bodies within the Solar System. The third large term is the deflection of the light ray path of the pulse due to the Sun, which is the primary influencing gravitational force within the Solar System. The second and third terms in Eq. (1) can be combined together to represent all the relativistic effects on the path length such that $$(t_{R_{SC}} - t_T) = \frac{1}{c}\hat{n}_{SC} \cdot (\bar{D} - \bar{p}) + \frac{1}{c}RelEff, \quad (2)$$

where c is the speed of light.

III. Range Measurement

The absolute range, $\rho$, i.e., the distance from the source 16 to the observer 12 can be computed from the transit and receive times of Eq. (2) as $$\rho = c(t_{R_{SC}} - t_T) \quad (3)$$

Using the representation of these times from Eq. (2), range can also be expressed in terms of the position vectors as $$\rho = \hat{n}_{SC} \cdot (\bar{D} - \bar{p}) + RelEff. \quad (4)$$

The unit vector along the direction from the observer 12 to the source 16 can be written in terms of the pulsar 16 and observer 12 positions as $$\hat{n}_{SC} = \frac{\bar{D} - \bar{p}}{\|\bar{D} - \bar{p}\|}. \quad (5)$$

Using Eq. (5), the range from Eq. (4) becomes, $$\rho\|\bar{D} - \bar{p}\| + RelEff. \quad (6)$$

The range vector is defined to be in the direction from the source to the observer. Since the magnitude of a vector is equal to the magnitude of the opposite direction vector, or $\|\bar{z}\| = \|-\bar{z}\|$, Eq. (6) can be more properly stated as the following:

$$\rho = \|\bar{p} - \bar{D}\| + RelEff. \quad (7)$$

This form of the equation is preferred because of the choice of the direction of the range vectors, and will be discussed in more detail in the "Measurement Differences" section below.

Eqs. (3), (4), and (7) represent the total path length, or range, that a pulse must travel from a source 16 to the observer 12. If the observer's position vector $\bar{p}$ and the source position vector $\bar{D}$ are accurately known, then the range can be directly determined from Eq. (4). Conversely, if the range between the source 16 and the observer 12 can be measured and used in conjunction with knowledge of the source position $\bar{D}$, rearranging Eq. (4) allows the observer's position $\bar{p}$ relative to the Sun to be computed. Thus, as is expected, any method that can provide a measure of the absolute range $\rho$ can contribute to determining observer position.

An absolute range measurement can be computed using Eq. (3), if the transmission and reception times are known for an individual pulse, and this measurement could be applied to Eq. (4) to determine observer position. However, a major complication is encountered in such implementation in that pulsars do not provide a means for conveying when an individual pulse was transmitted. Whereas, navigation systems such as the GPS and GLONASS systems, and Earth-bound navigation systems, provide the signal transmission time, which allows direct computation of range between a user and the transmitting satellite or station, pulsars, unfortunately, do not provide this information. However, as will be shown, observer position can still be determined using measurements from pulsars via beneficial features of the present invention.

III-1. Range Measurement Error

Within a navigation system, the range measurement, $\tilde{\rho}$, will differ from the true range, $\rho$, by some error amount, $\delta\rho$. The relationship between the true and measured range can be written as $$\rho = \tilde{\rho} + \delta\rho. \tag{8}$$

In terms of measured, or estimated, transmit and reception time for the $i^{th}$ pulsar, the measured range from Eq. (3) is $$\tilde{\rho}_i = c(\tilde{t}_{RSC_i} - \tilde{t}_{T_i}). \tag{9}$$

The measured range as determined from transmit and receive times will differ from the true range by several errors, including station clock and signal timing errors at the observer's station, $\delta t_{SC}$, intrinsic timing model errors or unknowns for a specific pulsar, $\delta T_i$, and range measurement noise, $\eta_i$. Assuming that these errors are introduced on the measurement linearly, the true range can be represented as the sum of the measurement and its errors:

$$\rho_i = c(\tilde{t}_{RSC_i} - \tilde{t}_{T_i}) + c\delta t_{SC} + c\delta T_i + \eta_i. \tag{10}$$

Similarly, in terms of measured, or estimated, source and observer position with respect to the $i^{th}$ pulsar, the measured range from Eq. (7) is $$\tilde{\rho}_i = \|\tilde{p} - \tilde{D}_i\| + \overline{\text{RelEff}}_i. \tag{11}$$

This form of measured range will also differ from the true range by several errors, including observer position error, $\delta\overline{p}$, source position error, $\delta\overline{D}_i$, relativistic effects error, $\delta \text{RelEff}_i$, as well as range measurement noise. If these errors are linearly imposed on the measurement, the true range may be represented as $$\rho_i = \|\tilde{p} - \tilde{D}_i\| + \overline{\text{RelEff}}_i + \|\delta\overline{p}\| + \|\delta\overline{D}_i\| + \delta \text{RelEff}_i + \eta_i. \tag{12}$$

The range measurement of Eq. (11) uses the magnitude of the geometric difference between the source and the observer. Alternatively, the estimate of line of sight direction to the source can be used from Eq. (5), such that the measured range is $$\tilde{\rho}_i = \tilde{n}_{SC_i} \cdot (\tilde{D}_i - \tilde{p}) + \overline{\text{RelEff}}_i. \tag{13}$$

The errors for this equation include those discussed with reference to Eq. (12) with an additional effect by the line of sight error, $\delta\tilde{n}_{SC_i}$. The true absolute range to the $i^{th}$ pulsar is then, $$\rho_i = \tilde{n}_{SC_i} \cdot (\tilde{D}_i - \tilde{p}) + \overline{\text{RelEff}}_i + \tilde{n}_{SC_i} \cdot \delta\overline{D}_i + \tilde{n}_{SC_i} \cdot \delta\overline{p} + \delta\tilde{n}_{SC_i} \cdot (\tilde{D}_i - \tilde{p}) + \delta \text{RelEff}_i + \eta_i. \tag{14}$$

It has been assumed in the discussion above that representative errors sum linearly to the measurement. Non-linear error effects may also be compensated for by known techniques as appropriate when such prove significant.

IV. Phase Measurement

The periodic nature of certain modulated celestial sources, such as pulsars, makes them valuable as navigation beacons. Since the periodicity of these sources is stable, it is possible to differentiate individual pulse cycles, i.e., the spatiotemporal periodicity of the radiation. At any given measurement time, however, the peak of the pulse, or other identifying structure of the modulated waveform, is not the characteristic of the pulse that is detected. Instead, a certain instance within the modulation cycle, or state of the modulation, will be measured. In certain embodiments of the invention, such modulation state is represented as the phase of the cycle, or a fraction of the pulse period, often measured in dimensionless units from zero to one. As such, a series of modulation cycles can be represented as a full cycle phase, $\Phi$, which is the sum of the fraction of a pulse, $\phi$, plus an integral number N of full cycles that have accumulated since a chosen initial time. Thus, full cycle phase can be written as $$\Phi = \phi + N. \tag{15}$$

The phase of a cycle, or series of elapsed cycles, emanating from the source and arriving at the observer is related to the range between the source and observer by the wavelength, $\lambda$, of the cycle, $$\rho = \lambda\Phi = \lambda\phi + \lambda N. \tag{16}$$

Therefore, if the number of cycles plus the fraction of the current pulse could be determined between the pulsar 16 and the observer, the range can be computed from Eq. (16). This equation provides an alternative method of determining range, rather than using transmit and receive time in Eq. (3) or source and receiver positions as in Eq. (4). However, as discussed earlier, the complication with using these celestial sources is that no identifying information is provided with each pulse, so that there is, no direct method of determining which specific cycle is being detected at any given time.

IV-1. Phase Measurement Error

The total measured cycle phase, $\tilde{\Phi}$, of a celestial source pulse from a detector system will differ from the true phase, $\Phi$, by any phase error, $\delta\Phi$, unresolved within the system, such as $$\Phi = \tilde{\Phi} + \delta\Phi \tag{17}$$

This phase error can be separated into errors, $\delta\phi$ and $\delta N$, within the measured fraction of phase, $\tilde{\phi}$, and the measured number of full cycles, $\tilde{N}$, respectively:

$$\phi + N = \tilde{\phi} + \tilde{N} + \delta\phi + \delta N. \tag{18}$$

Using Eqs. (11) and (16), the measured phase fraction and cycle number relate to the measured source and observer position as $$\lambda_i \tilde{\Phi}_i = \lambda_i (\tilde{\phi}_i + \tilde{N}_i) = \|\tilde{p} - \tilde{D}_i\| + \overline{\text{RelEff}}_i. \tag{19}$$

Since the measurement of phase is directly related to the timing of arriving pulses and the distance to the source, the combined effects of the errors from the range measurement of Eqs. (10) and (12), along with the specific phase measurement noise error, $\beta_i$, relate the true phase to the measured phase by the following:

$$\lambda_i \Phi_i = \lambda_i (\phi_i + N_i) \tag{20}$$
$$= \|\tilde{p} - \tilde{D}_i\| + \overline{\text{RelEff}}_i + c\delta t_{SC} + c\delta T_i +$$
$$\|\delta\overline{p}\| + \|\delta\overline{D}_i\| + \delta \text{RelEff}_i + \beta_i.$$

The measured phase can also be computed in terms of the source line of sight as in Eq. (13) to produce $$\lambda_i \tilde{\Phi}_i = \lambda_i (\tilde{\phi}_i + \tilde{N}_i) = \tilde{n}_{SC_i} \cdot (\tilde{D}_i - \tilde{p}) + \overline{\text{RelEff}}_i. \tag{21}$$

By including the line of sight errors from Eq. (14), the true phase can be represented as the following:

$$\lambda_i \Phi_i = \lambda_i (\phi_i + N_i) \quad (22)$$

$$= \tilde{n}_{SC_i} \cdot (\vec{D}_i - \vec{p}) + \overline{RelEff}_i + c\delta t_{SC} + c\delta T_i +$$

$$\tilde{n}_{SC_i} \cdot \delta \vec{D}_i + \tilde{n}_{SC_i} \cdot \delta \vec{p} + \delta \tilde{n}_{SC_i} \cdot (\vec{D}_i - \vec{p}) +$$

$$\delta RelEff_i + \beta_i$$

V. Pulse Timing Model

The modulated emission from variable celestial sources arrives at the Solar System with sufficient regularity that the arrival of each pulse can be predicted by a suitable model. By way of example, a starting cycle number, $\Phi_0 = \Phi(t_0)$, can be arbitrarily assigned to the pulse that arrives at a specific location at an initial time, $t_0$. The phase of subsequently arriving pulses, $\Phi$, measured as the sum of the fractions of the period and the accumulated whole value cycles as in Eq. (15), can be specified at the specific location using a pulsar phase model given by $$\Phi(t) = \Phi(t_0) + f[t - t_0] + \frac{\dot{f}}{2}[t - t_0]^2 + \frac{\ddot{f}}{6}[t - t_0]^3. \quad (23)$$

Eq. (23) is known as the pulsar spin equation, or pulsar spin down law. In this equation, the observation time, t, is in coordinate time, discussed in further detail below. The model in Eq. (23) uses pulse frequency, f, however the model can also be represented using pulse period, P, (also angular velocity $\Omega = 2\pi f$) using the following relationships:

$$f = \frac{1}{P}; P = \frac{1}{f} \quad (24)$$

$$\dot{f} = -\frac{\dot{P}}{P^2}; \dot{P} = -\frac{\dot{f}}{f^2}$$

$$\ddot{f} = \frac{2\dot{P}^2}{P^3} - \frac{\ddot{P}}{P^2}; \ddot{P} = \frac{2\dot{f}^2}{f^3} - \frac{\ddot{f}}{f^2}$$

to produce $$\Phi(t) = \Phi(t_0) + \frac{1}{P}[t - t_0] - \frac{\dot{P}}{2P^2}[t - t_0]^2 + \left(\frac{\dot{P}^2}{3P^3} - \frac{\ddot{P}}{6P^2}\right)[t - t_0]^3. \quad (25)$$

The model parameters for a particular pulsar are generated through repeated observations of the source until a parameter set is created that adequately fits the observed data. The accuracy of the model prediction depends on the quality of the known timing model parameters and on the intrinsic noise of the pulsar rotation. The pulse phase depends on the time at which it is measured as well as the position in space at which it is measured. Thus, a pulse timing model must also be defined for a specific location in space. The location of where the model is valid must be supplied in addition to the parameters that define the model to achieve accurate navigation data from pulsar radiation.

The pulsar phase model of Eq. (23), or (25), allows the determination of the phase of a pulse signal at a future time 1, relative to a reference epoch to, at a specified position in space. Thus, it is possible to predict a state of the modulated radiation, such as when any peak amplitude of a pulsar signal is expected to arrive at a given location. The model shown in Eq. (23) utilizes pulse frequency and only two of its derivatives (equivalently, Eq. (25) uses period and its two derivatives), however, any number of derivatives may be incorporated to achieve a model that reproduces a particular pulsar's pulse timing behavior to within a desired accuracy. Additionally, a larger number of model parameters are used in certain embodiments of the model to predict more complex behavior of certain pulsars, such as those in binary systems. As long as these parameters can be sufficiently determined and incorporated in the model, any source with detectable periodic modulation may be used in the navigation method of the present invention.

VI. Coordinate Time

Arrival times of photons from celestial sources is a fundamental measurable component within a pulsar-based navigation system. Accuracy of the pulse arrival timing is critical for a high performance navigation system. Referring once again to the exemplary onboard pulsar-based navigation system of FIG. 11, there is shown that in addition to a detectors 22a-22x and instruments to detect arriving photons, a high performance clock 24 or oscillator (such as an atomic clock) is utilized for accurate measurement of photon arrival timing. The processor 30 facilitates the data collection and performs navigation calculations based on the measured photon arrival times and the modeled arrival times. The time measured by the onboard clock 24 is referred to as proper time, which is the time a clock measures its detected events as it travels though four-dimensional spacetime. This proper time can be different from coordinate time, which is the time measured by a standard clock that is fixed (not moving) in an inertial frame and not under the influence of gravity (located at infinite distance). The appropriate method of converting from spacecraft proper time, $\tau$, to coordinate time, t, is to account for the total gravitational potential, U, acting upon the spacecraft's clock, and the total velocity, v, of the spacecraft 12 within the inertial frame. Coordinate time can be determined from proper time by integrating, $$dt = \left[1 + \frac{U}{c^2} + \frac{1}{2}\left(\frac{v}{c}\right)^2\right]d\tau. \quad (26)$$

Since the clocks onboard orbiting spacecraft, as well as those on Earth, will measure proper time, all observation times must be converted to coordinate time defined within an inertial reference frame so that pulse arrival times measured at different detectors can be properly compared. Many existing spacecraft systems align their onboard clocks with Earth standard times such as Coordinated Universal Time (UTC), or Temps Atomique International (TAI, International Atomic Time). These times are then often converted to Earth-based coordinate time of either Terrestrial Dynamical Time (TDT) [sometimes referred to as Terrestrial Time (TT)], or Temps Coordonnée Géocentrique (TCG, Geocentric Coordinate Time). TCG is the coordinate time scale with respect to the Earth's center, and TCG differs from TT by a scaling factor.

Two time scales exist which support event timing within the Solar System, and each have their origin at the SSB, shown at 100 in FIG. 1. These are the Temps Dynamique Barycentrique (TDB, Barycentric Dynamical Time), and Temps Coordonnée Barycentrique (TCB, Barycentric Coordinate Time). Many current pulsar observations are computed using the TDB time scale. Recent improvements in time-ephemeris models may prove that the TCB scale produces increased pulsar model accuracy.

Once a pulsar's model is defined, such as in accordance with the "Pulse Timing Model" section above, the model's use is contingent on the coordinate time scale and the valid location being provided to an observer. For example, a common scheme presently utilized is the Solar System Barycentric (SSB) coordinate frame combined with the TDB time scale. These models are often described to be valid at the origin of the TDB frame, which is the origin of the SSB frame. As is described further in paragraphs that follow, a timing model of the present invention based on this configuration would be valid at the SSB and would expect as input a coordinate time transferred to the SSB in accordance with TDB system of time measurement. The model would then return a state of the emitted celestial radiation, e.g., phase or pulse arrival time, at the SSB and at the inputted coordinate time corresponding to the celestial source so modeled.

Certain navigation processes of the present invention require that pulse arrival time at a detector, such as one on Earth or on a spacecraft, be compared to a pulsar timing model that is defined to be valid at a specific location, such as the SSB origin 100. As such, pulse arrival time must be transferred to the SSB origin 100 for comparison. Alternatively, the pulsar timing model could be transferred to another known location. For example, at a given time instance, the pulsar timing model could be transferred to the Earth's center, if time of measured pulse arrival is to be compared with arrival at the Earth's center.

To accurately transfer time from one location to another, geometric and relativistic effects must be included in the transfer. These effects account for the difference in light ray paths from a source to the respective locations of the detector and the model, in accordance with the existing theory of general relativity and known effects of the celestial planetary systems.

Figure 3:
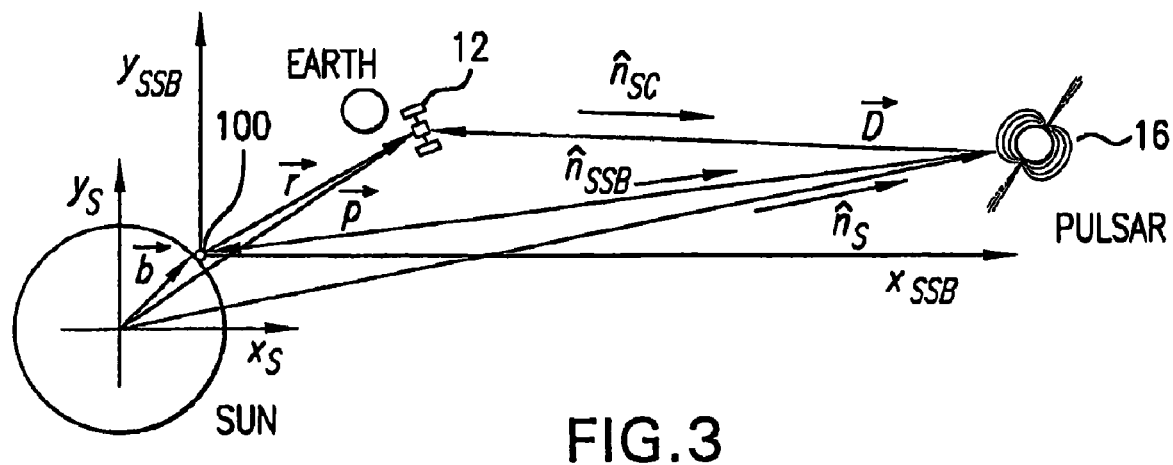
FIG. 3 is a schematic diagram illustrating spacecraft position relative to the sun and the Solar System Barycenter (SSB) origin.

To provide an example, consider the time transfer between a spacecraft 12 and the SSB origin 100. FIG. 3 presents a diagram of the positions of each relative to the center of the Sun, which is the primary potential gravitational influence within the Solar System. As shown in the Figure, the SSB 100 is the origin of the reference frame identified by the $x_{SSB}$, $y_{SSB}$ axes and is located relative to the Sun, which is at the origin of the $x_s$, $y_s$ system, at $\bar{b}$. The location of spacecraft 12 with respect to the Sun is $\bar{p}$, as was illustrated in FIG. 2, while the location of spacecraft 12 with respect to the SSB is $\bar{r}$. The spacecraft's location with respect to pulsar 16 is $\overline{D}$, as was shown in FIG. 2.

Eq. (1) may be used to compute the elapsed time between the emission of a pulse at the source 16 and the arrival of a pulse at the spacecraft 16. The corresponding equation for the elapsed time for a pulse to traverse the region between the emitting source 16 and the SSB origin 100 is the following:

$$(t_{R_{SSB}} - t_T) = \tag{27}$$

$$\frac{1}{c}\hat{n}_{SSB} \cdot (\overline{D} - \bar{b}) - \sum_{k=1}^{P_{SS}} \frac{2GM_k}{c^3} \ln\left|\frac{\hat{n}_{SSB} \cdot \bar{b}_k + b_k}{\hat{n}_{SSB} \cdot \overline{D}_k + D_k}\right| + \frac{2\mu_S^2}{c^5 D_{y_{SSB}}^2}$$

$$\left\{\hat{n}_{SSB} \cdot (\overline{D} - \bar{b})\left[\left(\frac{\hat{n}_{SSB} \cdot \overline{D}}{D}\right)^2 + 1\right] + 2(\hat{n}_{SSB} \cdot \overline{D})\left[\frac{b}{D} - 1\right] + D_{y_{SSB}}\left[\arctan\left(\frac{b_x}{D_{y_{SSB}}}\right) - \arctan\left(\frac{D_{x_{SSB}}}{D_{y_{SSB}}}\right)\right]\right\}.$$

The difference in elapsed coordinate time between the time for a pulse emitted at the source to arrive at each of the spacecraft 12 and the SSB positions, can be represented by $$(t_{R_{SSB}} - t_T) - (t_{R_{SC}} - t_T) = (t_{R_{SSB}} - t_{R_{SC}}), \tag{28}$$

Subtracting Eq. (1) from Eq. (27) yields the transfer time between the spacecraft 12 and the SSB 100, $$t_{R_{SSB}} - t_{R_{SC}} = \tag{29}$$

$$\frac{1}{c}\hat{n}_{SSB} \cdot (\overline{D} - \bar{b}) - \frac{1}{c}\hat{n}_{SC} \cdot (\overline{D} - \bar{p}) - \sum_{k=1}^{P_{SS}} \frac{2GM_k}{c^3} \ln\left|\frac{\hat{n}_{SSB} \cdot \bar{b}_k + b_k}{\hat{n}_{SSB} \cdot \overline{D}_k + D_k}\right| +$$

$$\sum_{k=1}^{P_{SS}} \frac{2GM_k}{c^3} \ln\left|\frac{\hat{n}_{SC} \cdot \bar{p}_k + p_k}{\hat{n}_{SC} \cdot \overline{D}_k + D_k}\right| + \frac{2\mu_S^2}{c^5 D_{y_{SSB}}^2}$$

$$\left\{\hat{n}_{SSB} \cdot (\overline{D} - \bar{b})\left[\left(\frac{\hat{n}_{SSB} \cdot \overline{D}}{D}\right)^2 + 1\right] + 2(\hat{n}_{SSB} \cdot \overline{D})\left[\frac{b}{D} - 1\right] + D_{y_{SSB}}\left[\arctan\left(\frac{b_x}{D_{y_{SSB}}}\right) - \arctan\left(\frac{D_{x_{SSB}}}{D_{y_{SSB}}}\right)\right]\right\} -$$

$$\frac{2\mu_S^2}{c^5 D_y^2}\left\{\hat{n}_{SC} \cdot (\overline{D} - \bar{p})\left[\left(\frac{\hat{n}_{SC} \cdot \overline{D}}{D}\right)^2 + 1\right] + 2(\hat{n}_{SC} \cdot \overline{D})\left[\frac{p}{D} - 1\right] + D_y\left[\arctan\left(\frac{p_x}{D_y}\right) - \arctan\left(\frac{D_x}{D_y}\right)\right]\right\}$$

Clearly, Eq (29) entails a certain complexity in its algorithmic implementation. However, simplifications to this algorithm can still produce accurate time transfer (on the order of a few nanoseconds). For example, if the line of sight to the emitting source is considered constant within the Solar System, such that $\hat{n}_{SC} \approx \hat{n}_{SSB} \approx \hat{n} \approx \overline{D}_0/D_0$, the proper motion of the emitting source is included, such that $\overline{D}_M = \overline{D}_0 + \overline{V}(t_{T_M} - t_{T_0}) = \overline{D}_0 + \overline{V}\Delta t_T$ for the $M^{th}$ pulse, where $\overline{V}$ is the velocity vector thereof, and the difference of the curvature of the light ray paths is negligible, Eq. (29) can be simplified to the following:

$$(t_{R_{SSB_M}} - t_{R_{SC_M}}) = \tag{30}$$

$$\frac{1}{c}\begin{bmatrix} \hat{n} \cdot \bar{r}_M - \frac{r_M^2}{2D_0} + \frac{(\hat{n} \cdot \bar{r}_M)^2}{2D_0} + \frac{\bar{r}_M \cdot \overline{V}\Delta t_T}{D_0} - \\ (\hat{n} \cdot \overline{V}\Delta t_T) \\ \frac{(\hat{n} \cdot \bar{r}_M)}{D_0} + \frac{(\hat{n} \cdot \bar{r}_M)}{D_0^2}\left[(\bar{r}_M \cdot \overline{V}\Delta t_T) - \frac{r_M^2}{2}\right] + \\ (\hat{n} \cdot \overline{V}\Delta t_T) \quad (\hat{n} \cdot \overline{V}\Delta t_T) \\ \frac{(r_M^2)}{2D_0^2} - \frac{(\bar{r}_M \cdot \overline{V}\Delta t_T)}{D_0^2} - \frac{(\bar{b}_M \cdot \bar{r}_M)}{D_0} + \\ (\hat{n} \cdot \bar{b}_M) \\ \frac{(\hat{n} \cdot \bar{r}_M)}{D_0} + \frac{(\hat{n} \cdot \bar{r}_M)}{D_0^2}\left[-(\bar{b}_M \cdot \bar{r}_M) - \frac{b_M^2}{2} + (\bar{b}_M \cdot \overline{V}\Delta t_T)\right] + \\ (\hat{n} \cdot \overline{V}\Delta t_T) \\ \frac{(\hat{n} \cdot \bar{b}_M)}{D_0^2}\left[-(\bar{b}_M \cdot \bar{r}_M) - \frac{r_M^2}{2} + (\bar{r}_M \cdot \overline{V}\Delta t_T)\right] + \frac{(\bar{b}_M \cdot \bar{r}_M)}{D_0^2} \end{bmatrix} +$$

-continued $$\sum_{k=1}^{P_{SS}} \frac{2GM_k}{c^3} \ln\left|\frac{\hat{n}\cdot\vec{r}_{M_k} + r_{M_k}}{\hat{n}\cdot\vec{b}_{M_k} + b_{M_k}} + 1\right|$$

In Eq. (30) and referring to FIG. 3, $\vec{r}_M$ is the position of the spacecraft 12 with respect to the SSB 100 at the time of reception of the $M^{th}$ pulse and $\vec{b}_M$ is the location of the SSB at the time the $M^{th}$ pulse is received.

Additionally, further simplifications, such as ignoring all terms of order $O(1/D_0^2)$, yields a time transfer algorithm accurate to roughly 10 microseconds, $$\left(t_{R_{SSB_M}} - t_{R_{SC_M}}\right) = \frac{1}{c}\begin{bmatrix} \hat{n}\cdot\vec{r}_M - \frac{r_M^2}{2D_0} + \frac{(\hat{n}\cdot\vec{r}_M)^2}{2D_0} + \\ (\hat{n}\cdot\vec{V}\Delta t_T) \\ \frac{\vec{r}_M\cdot\vec{V}\Delta t_T}{D_0} - \frac{(\hat{n}\cdot\vec{r}_M)}{D_0} - \\ \frac{(\vec{b}_M\cdot\vec{r}_M)}{D_0} + \frac{(\hat{n}\cdot\vec{b}_M)(\hat{n}\cdot\vec{r}_M)}{D_0} \end{bmatrix} + \sum_{k=1}^{P_{SS}} \frac{2GM_k}{c^3}\ln\left|\frac{\hat{n}\cdot\vec{r}_{M_k} + r_{M_k}}{\hat{n}\cdot\vec{b}_{M_k} + b_{M_k}} + 1\right| \quad (31)$$

Using any of the expressions from Eq. (29), (30), or (31), provides a method to transfer time from the spacecraft's position to the SSB position. Additionally, these equations can be used to transfer time between the spacecraft 12 and any known position, by replacing the position of the SSB's origin, $\vec{b}$, with the known position. Thus, these expressions provide a method to accurately compare the arrival time of a pulse at the spacecraft 12 with those of pulsar timing models that can be defined at any known location.

Time transfer is an important aspect for accurate navigation using modulated celestial sources. However, as will be discussed in paragraphs that follow, this time transfer requires knowledge, or at least an estimate, of detector position in order to be implemented. For an absolute positioning system, prior knowledge of position is not intended to be an input to the navigation process and is not known. In fact, it is the determination of the unknown position that is the ultimate goal of the process. Although this time transfer requires position knowledge, it will be shown that further simplified time transfer expressions from those listed above can be used, which do not require prior knowledge of detector position.

VII. Pulse Arrival Time Determination

The exemplary methods described below rely on differences in range or in modulation phase as measured at the spacecraft and as estimated at the model's defined, or valid, location. If the model's defined location is far from the spacecraft, then many pulse cycles may exist between the two locations. Whereas, if the model's defined location is relatively close to the spacecraft, then it is possible that only a fraction of a pulse cycle exists between the two locations. In order to calculate the range or phase differences, photon arrival times at the detector must be transferred to the model's defined location.

For spacecraft orbiting Earth, implementation problems associated with multiple pulse cycles between the vehicle's detector and the SSB, i.e., the exemplary model validity location, are ameliorated by using pulsars with large periods. Using sources with periods greater than 500 sec ($\approx$1 A U/c) ensures there is only one cycle between the SSB and Earth. Long pulse periods, however, also require longer observation time, which is detrimental to the spacecraft's ability to quickly resolve absolute position. A more desirable method for allowing only few cycles between the spacecraft and the pulse model location is to ensure that the model's defined location is close to the spacecraft. For example, spacecraft orbiting Earth, or near-Earth, are better served by embodiments of the invention that use model locations at the geocenter (Earth-center) or the Earth-Moon barycenter. Although these locations are not truly inertial locations, compensations in the pulse models as well as short observation times would allow these locations to be used as defined model locations. Alternatively, any location near the spacecraft could be used for the model location. For example, a spacecraft orbiting Mars or Jupiter could use the center of those planets or their system's barycenter, as the model location. In such cases, transferring, or redefining, existing pulsar timing models defined at the SSB to these new locations would be required, but still may be used with the present invention.

To identify a pulsar and using a signal emitted thereby for navigation, certain embodiments of the present invention collect observation data, e.g., incoming photons, over time to produce a modulation profile corresponding to a modulated celestial source. As these data are collected, the celestial source that is likely to have emitted the modulated celestial radiation may be identified, for example, by comparing the integrated observation data to a catalogue of modulation profile templates stored in, for example, on-board memory 34. In certain embodiments of the invention, the identity of the celestial source can be used to filter the observation data, such that a modulation profile with higher signal-to-noise ratio may be obtained.

High signal-to-noise template profiles that reveal a pulsar's pulse profile with great clarity require exact knowledge of where the pulses were detected prior to time transfer. The signal-to-noise ratio of the real-time modulation profile is also dependent on knowledge of the location of the detector. However, much spacecraft navigation data are generally unknown, and as such, time transfer from the unknown location introduces noise onto the transferred profile. Using a planetary center as an assumed location instead of actual detector position alters the pulse profile shape from the ideal after time transferral of the data, which produces navigation errors when the profile is compared to a stored template. The noise within the pulse grows due to the time transfer error. Assuming no knowledge of spacecraft position at all is to ignore the effects on photon arrival time attributable to the spacecraft's motion within the inertial frame.

Certain embodiments of the invention have among their beneficial features an improved comparison by which a pulse arrival timing model is formulated that exists at a planetary center. The difference of the pulse arrival time at a spacecraft that is close to a planet to the predicted arrival time at the planetary center thereof is computed, instead of the computations referred to the distant SSB. For example, for pulse cycle wavelengths of modulated celestial source emissions that are approximately 10,043 km ($=0.0335*c$), vehicles located near a planet of radius of about 6,400 km will remain within ± one cycle with respect to that planet's center.

If a spacecraft is moving in a plane perpendicular to the direction towards a pulsar, then arriving pulses will not be affected by the vehicle's motion. However, motion towards or away from the pulsar, introduces a shift in wavelength caused by the well-known Doppler Effect. In certain embodiments of the invention, radiation profiles are created by a technique known in the art as "folding". This is a process by which data are synchronously integrated over time to produce a high signal-to-noise profile of one cycle, or perhaps a small number of cycles. If a profile is not corrected by time-transferring photon arrival times to the inertial origin, the Doppler Effect essentially smears, or distorts, the folded modulation profile. Motion perpendicular to the direction towards a pulsar is indicated by the dot product of this direction and spacecraft velocity being small, preferably zero. In certain simplified embodiments of the present invention, only observations made when the vehicle's motion is primarily within this perpendicular plane are utilized in navigation computations.

Certain embodiments of the invention implement an iterative scheme involving observations to improve the absolute position determination process. In some embodiments, a first iteration assumes the vehicle is at some predefined location, such as a planetary center and a position estimate is updated by processes described below. Subsequent iterations of the same observations using the corrected position estimates further remove position error until a solution is reached that satisfies all observations from multiple pulsars.

VIII. Measurement Differences

Figure 4:
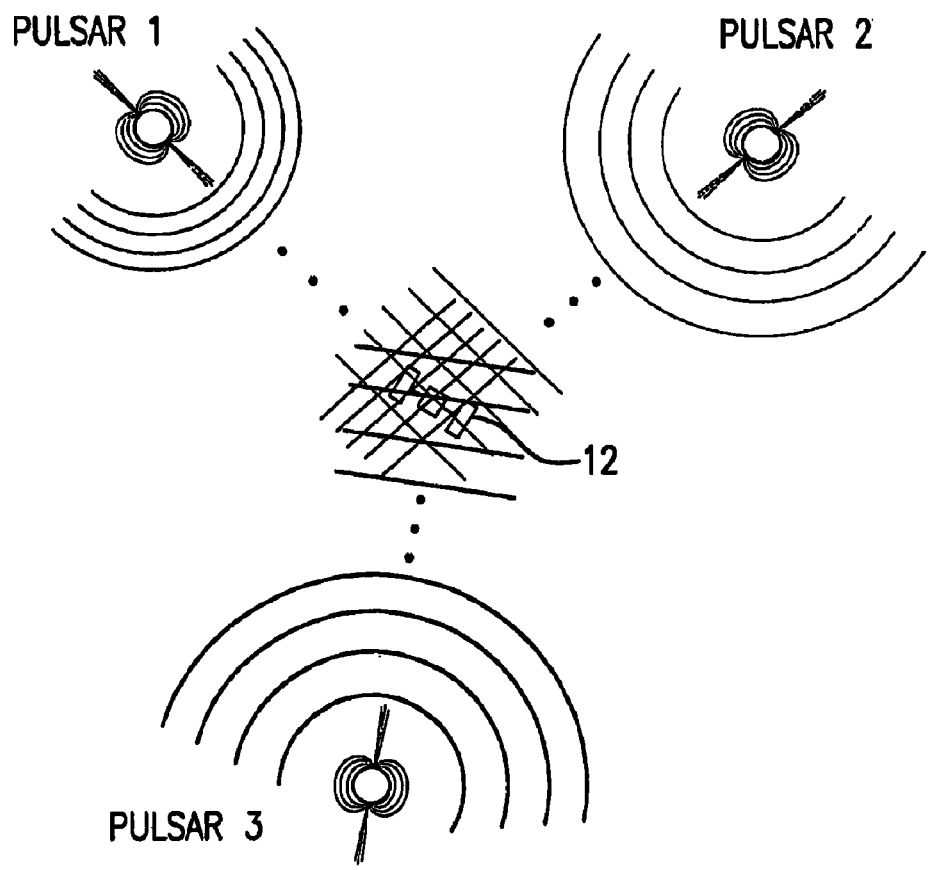
FIG. 4 is a schematic diagram illustrating pulse arrivals from a plurality of sources of pulsed celestial radiation.

Referring to FIG. 4, there is shown an illustration of the arrival of pulses at a spacecraft 12 from three pulsars. At any given instance, certain embodiments of the invention assumes that there is only one unique set relationships between arriving pulses from the set of pulsars that solves for the exact location of the vehicle. By identifying a set of pulses having the unique spatial relationship, the position of the vehicle can be determined.

Due to the significant distances between the celestial sources and the Solar System, the modulation wavefronts of arriving radiation are assumed to be planar, as illustrated, not spherical. By ignoring the spherical effects of the wave propagation, position determination is significantly simplified. However, when the spacecraft 12 and location of the model used for comparison are very far apart, effects of the spherical geometry should be accounted for.

For a single pulsar 16, a difference can be computed between the pulse arrival time at the detector and the predicted arrival time at the model location. The difference identifies a set of candidate positions along the line of sight to the pulsar 16. These candidate locations correspond to the value of pulse phase plus or minus multiple whole value pulse cycle lengths. By adding phase information obtained from multiple sources, only one unique position satisfies the differences between data from a set of pulsars and their corresponding models.

Alternatively, a "phase cycle ambiguity search space" can be created. Prior art Time Difference of Arrival (TDOA) systems utilize two detectors or sensors to measure a source's signal, and data from these two systems are differenced. Contrastingly, certain embodiments of the present invention uses a model of pulse arrival that is defined to exist at a specified location, thus there is only one physical detector actually present in the system. The navigation system of the present invention can compute the entire absolute position without externally supplied navigation data from a secondary reference source. This is a true absolute positioning system, since the navigation system's detector needs only to observe celestial source data, and determine its location within a given inertial frame.

Several types of differencing techniques are described below. The "Single Difference" is the difference between the measured phase at the detector and the phase predicted at a model location for a single pulsar 16. The "Double Difference" is the subtraction of two single differences from two separate pulsars. The "Triple Difference" is the subtraction of two double differences between two separate time epochs. The benefits of computing these differences include removing immeasurable errors; and higher order differences remove additional errors. The complexity of using higher order differences includes requiring more observable sources to produce solutions, which may involve additional observation time.

IX. Single Difference

Measurements of the pulsed radiation from celestial sources can be differenced with the predicted arrival time from a pulse timing model, which is defined at a specific location within an inertial frame. Any specified location can be used, however, the most common location is the SSB origin 100, which will be used as the model location in the exemplary embodiments described below.

The single difference method advantageously removes any values common to both the spacecraft 12 and the model location, such as the range to the pulsar, which is often not known to any great accuracy.

X. Range Single Difference

Figure 5:
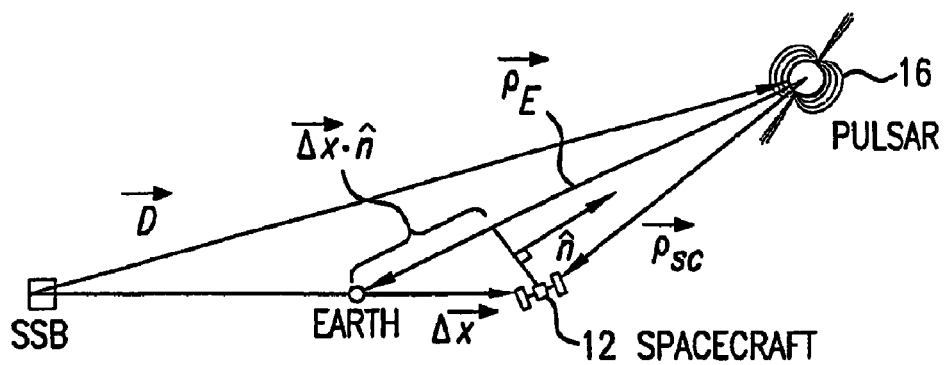
FIG. 5 is a vector plot showing range vectors from a single pulsar to the Earth and spacecraft location.

The range vectors between the pulsar 16 and Earth, $\bar{\rho}_E$, and between the pulsar 16 and the spacecraft 12, $\bar{\rho}_{SC}$, are shown in FIG. 5. The source is assumed to be extremely far away from the Solar System. Consequently the difference in these range vectors provides an estimate of the difference between Earth and the spacecraft 12, $\Delta \bar{x}$.

X-1. Geometric Considerations

Considering only the geometric representation from FIGS. 1 and 5, the position of the spacecraft 12 relative to Earth can be represented using the vectors of these two positions within the SSB inertial frame:

$$\Delta \bar{x} = \Delta \bar{r} = \bar{r}_{SC} - \bar{r}_E. \qquad (32)$$

This position can also be represented by the range vectors from the $i^{th}$ celestial source as, $$\Delta \bar{x} = \Delta \bar{\rho}_i = \bar{\rho}_{SC_i} - \bar{\rho}_{E_i}. \qquad (33)$$

Within the SSB inertial frame, the direction, or line of sight, to the source may be considered as a constant, due to the extreme distances to the sources. Thus, the unit direction to the source can be represented using its known position within the inertial frame, which is in the negative direction from the source to either the spacecraft 12 or Earth:

$$\hat{n}_i = \frac{\bar{D}}{D} \approx -\hat{\rho}_{SC_i} \approx -\hat{\rho}_{E_i}. \qquad (34)$$

The range vector can be represented using its magnitude and direction, as $\|\bar{\rho}\| = \rho$, or $\bar{\rho} = \rho\hat{\rho}$. Using the unit direction from Eq. (34), the difference in range magnitude represents the spacecraft's position along the line of sight to the pulsar 16 as, $$\Delta \rho_i = \rho_{E_i} - \rho_{SC_i} = \hat{n}_i \cdot \Delta \bar{x}. \qquad (35)$$

It is important to notice the distinction between the range vector difference, $\Delta \bar{\rho}_i$, from Eq. (32) and the range magnitude difference, $\Delta \rho_i$, from Eq. (35). Since the line of sight from the SSB 100 to the source 16 is in opposite direction with respect to the range vectors, the range vector difference is in opposite sense as the range magnitude difference. This is shown in FIG. 5.

X-2. Relativistic Effects

As was discussed in the "Observables and Errors" section above, the relativistic effects on the path of a photon from the source to either the spacecraft 12 or Earth should be considered if accurate position determination is desired. With the addition of these effects, the range difference using Eq. (7) becomes, $$\Delta\rho_i = \rho_{E_i} - \rho_{SC_i} \quad (36)$$

$$= [\|\vec{r}_E - \vec{D}_i\| + RelEff_{E_i}] - [\|\vec{r}_{SC} - \vec{D}_i\| + RelEff_{SC_i}]$$

$$= [\|\vec{r}_E - \vec{D}_i\| - \|\vec{r}_{SC} - \vec{D}_i\|] + [RelEff_{E_i} - RelEff_{SC_i}]$$

The position magnitude difference in the first term of Eq. (36) can be represented as $$[\|\vec{r}_E - \vec{D}_i\| - \|\vec{r}_{SC} - \vec{D}_i\|] = (\vec{r}_E \cdot \vec{r}_E - 2\vec{r}_E \cdot \vec{D}_i + \vec{D}_i \cdot \vec{D}_i)^{\frac{1}{2}} - \quad (37)$$

$$(\vec{r}_{SC} \cdot \vec{r}_{SC} - 2\vec{r}_{SC} \cdot \vec{D}_i + \vec{D}_i \cdot \vec{D}_i)^{\frac{1}{2}}$$

$$= \vec{D}_i \left( \frac{r_E^2}{D_i^2} - \frac{2\vec{r}_E \cdot \vec{D}_i}{D_i^2} + 1 \right)^{\frac{1}{2}} -$$

$$\vec{D}_i \left( \frac{r_{SC}^2}{D_i^2} - \frac{2\vec{r}_{SC} \cdot \vec{D}_i}{D_i^2} + 1 \right)^{\frac{1}{2}}$$

Using a binomial expansion of the square root terms and the line of sight simplification from Eq. (34) produces $$[\|\vec{r}_E - \vec{D}_i\| - \|\vec{r}_{SC} - \vec{D}_i\|] \approx \vec{D}_i \left[ 1 + \frac{1}{2} \left( \frac{r_E^2}{D_i^2} - \frac{2\vec{r}_E \cdot \vec{D}_i}{D_i^2} \right) \right] - \quad (38)$$

$$\vec{D}_i \left[ 1 + \frac{1}{2} \left( \frac{r_{SC}^2}{D_i^2} - \frac{2\vec{r}_{SC} \cdot \vec{D}_i}{D_i^2} \right) \right] +$$

$$O\left(\frac{1}{D_i^2}\right)$$

$$\approx \frac{1}{2D_i}(r_E^2 - r_{SC}^2) + \left( \vec{r}_{SC} \cdot \frac{\vec{D}_i}{D_i} - \vec{r}_E \cdot \frac{\vec{D}_i}{D_i} \right) + O\left(\frac{1}{D_i^2}\right)$$

$$\approx \hat{n}_i \cdot (\vec{r}_{SC} - \vec{r}_E) + \frac{1}{2D_i}(r_E^2 - r_{SC}^2) +$$

$$O\left(\frac{1}{D_i^2}\right)$$

Therefore the range difference expression can be simplified from Eq. (36) as $$\Delta\rho_i \approx \quad (39)$$

$$\hat{n}_i \cdot (\vec{r}_{SC} - \vec{r}_E) + \frac{1}{2D_i}(r_E^2 - r_{SC}^2) + [RelEff_{E_i} - RelEff_{SC_i}] + O\left(\frac{1}{D_i^2}\right).$$

In that the second term of Eq. (39) is small, $$\Delta\rho_i \approx \hat{n}_i \cdot \Delta\vec{x} + [RelEff_{E_i} - RelEff_{SC_i}] + O(1/D_i). \quad (40)$$

The expression for the single difference in Eqs. (39) or (40) shows one of the benefits of its implementation. The poorly known pulsar distance, $\overline{D}_i$, has been removed from the equations. Thus, spacecraft position computations no longer rely on the measurement of range directly from the pulsar 16. The range difference is only related to the spacecraft position difference and the difference in relativistic effects to order $O(1/D_i)$.

X-3. Range Single Difference Measurement with Errors

The true range difference is actually a function of the measured values and error terms associated with the limitations in measuring those values. From the range expression of Eq. (12), the range difference becomes $$\Delta\tilde{\rho}_i = [\|\tilde{r}_E - \tilde{D}_i\| + \overline{RelEff}_{E_i} + \|\delta\vec{r}_E\| + \|\delta\vec{D}_{E_i}\| + \quad (41)$$

$$\delta RelEff_{E_i} + \eta_{E_i}] -$$

$$[\|\tilde{r}_{SC} - \tilde{D}_i\| + \overline{RelEff}_{SC_i} + \|\delta\vec{r}_{SC}\| + \|\delta\vec{D}_{SC_i}\| +$$

$$\delta RelEff_{SC_i} + \eta_{SC_i}]$$

$$= [\|\tilde{r}_E - \tilde{D}_i\| - \|\tilde{r}_{SC} - \tilde{D}_i\|] + [\overline{RelEff}_{E_i} - \overline{RelEff}_{SC_i}] +$$

$$[\|\delta\vec{r}_E\| - \|\delta\vec{r}_{SC}\|] +$$

$$[\|\delta\vec{D}_{E_i}\| - \|\delta\vec{D}_{SC_i}\|] + [\delta RelEff_{E_i} - \delta RelEff_{SC_i}] +$$

$$[\eta_{E_i} + \eta_{SC_i}]$$

The first term in Eq. (41) was estimated in Eq. (38) and the range single difference is thus $$\Delta\tilde{\rho}_i \approx \hat{n}_i \cdot \Delta\vec{x} + [\overline{RelEff}_{E_i} - \overline{RelEff}_{SC_i}] + [\|\delta\vec{r}_E\| - \|\delta\vec{r}_{SC}\|] + \quad (42)$$

$$[\|\delta\vec{D}_{E_i}\| - \|\delta\vec{D}_{SC_i}\|] + [\delta RelEff_{E_i} - \delta RelEff_{SC_i}] + [\eta_{E_i} - \eta_{SC_i}]$$

XI. Phase Single Difference

Figure 6:
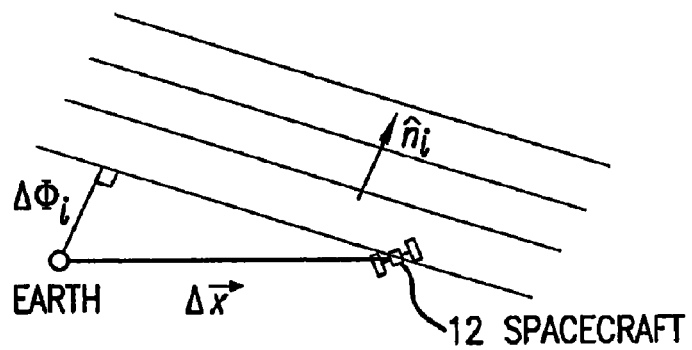
FIG. 6 is a schematic diagram illustrating phase difference for an individual pulse arriving at a spacecraft and the Earth.

The phase of the arriving pulse from a celestial source can be differenced between the spacecraft and a known model location, similar to the range difference described above. The phase difference represents the fraction of cycle phase, or fraction of phase plus a fixed number of integer cycles, from an arriving pulse between the spacecraft 12 and the model location. FIG. 6 provides a diagram of arriving pulses from a single celestial source 16 at a spacecraft 12 and Earth, however any location where the pulse timing model is defined can be utilized. By measuring the phase difference, $\Delta\Phi_i$, the spacecraft's position with respect to Earth along the line of sight to the source, $\hat{n}_i$, is determined. Using multiple measured phase differences from different sources provides a method of determining the spacecraft's three-dimensional position with respect to Earth in an inertial frame.

XI-1. Geometric Considerations

Phase difference is directly related to range difference when the wavelength, $\lambda_i$, of the cycle is included. From FIGS. 5 and 6, the geometric relationship of phase with respect to range from a source can be expressed as $$\Delta\rho_i = \rho_{E_i} - \rho_{SC_i} \quad (43)$$

$$= \lambda_i \Delta\Phi_i$$

-continued $$= \lambda_i(\Delta\phi_i + \Delta N_i)$$

$$= \lambda_i[(\phi_{E_i} - \phi_{SC_i}) + (N_{E_i} - N_{SC_i})].$$

The geometric relationship of phase with respect to spacecraft position is then $$\lambda_i \Delta \Phi_i = \lambda_i(\Delta\phi_i + \Delta N_i) = \hat{n}_i \cdot \Delta \bar{x}. \quad (44)$$

XI-2. Relativistic Effects

As was the case with the range differencing method described above, improved accuracy is attained in phase differencing when the relativistic effects on the light ray paths from the source are included. From Eq.(36), the phase difference becomes $$\lambda_i \Delta \Phi_i = \lambda_i(\Delta\phi_i + \Delta N_i) = [\|\bar{r}_E - \bar{D}_i\| - \|\bar{r}_{SC} - \bar{D}_i\|] + [\text{RelEff}_{E_i} - \text{RelEff}_{SC_i}]. \quad (45)$$

If the simplifications to the first term are included, as was considered in Eq. 38), and the line of sight is included from Eq. (34), this phase difference becomes $$\lambda_i \Delta \Phi_i = \lambda_i(\Delta\phi_i + \Delta N_i) \approx \hat{n}_i \cdot \Delta \bar{x} + [\text{RelEff}_{E_i} - \text{RelEff}_{SC_i}] + O(1/D_i). \quad (46)$$

XI-3. Phase Single Difference Measurement with Errors

Actual phase measurements made at the detector, or pulse sensor 22, of a spacecraft 12 will contain errors, similar to an actual range measurement. Referring to the measurement errors for phase from Eq. (20), the phase difference calculation is related to these errors as $$\lambda_i \Delta \Phi_i = \lambda_i(\Delta\phi_i + \Delta N_i) \quad (47)$$

$$= [\|\tilde{r}_E - \tilde{D}_i\| - \|\tilde{r}_{SC} - \tilde{D}_i\|] + [\overline{\text{RelEff}}_{E_i} - \overline{\text{RelEff}}_{SC_i}] +$$

$$[c\delta t_E - c\delta t_{SC}] +$$

$$[c\delta T_i - c\delta T_i] + [\|\delta \tilde{r}_E\| - \|\delta \tilde{r}_{SC}\|] +$$

$$[\|\delta \overline{D}_{E_i}\| - \|\delta \overline{D}_{SC_i}\|] + [\delta \text{RelEff}_{E_i} - \delta \text{RelEff}_{SC_i}] +$$

$$[\beta_{E_i} - \beta_{SC_i}]$$

It should be noted from Eq. (47) that the term involving pulsar intrinsic model error, $c\delta T_i$, cancels when computing a phase single difference. This is a significant benefit in that any errors that exist in the pulse timing model for a specific pulsar 16 are removed from the computation of position when using a phase difference. With the additional simplification of the first term on the right hand side of Eq. (47) using Eq. (38), the phase single difference equation becomes, $$\lambda_i \Delta \Phi_i = \lambda_i(\Delta\phi_i + \Delta N_i) \quad (48)$$

$$\approx \hat{n}_i \cdot \Delta \bar{x} + [\overline{\text{RelEff}}_{E_i} - \overline{\text{RelEff}}_{SC_i}] +$$

$$[c\delta t_E - c\delta t_{SC}] + [\|\delta \tilde{r}_E\| - \|\delta \tilde{r}_{SC}\|] +$$

$$[\|\delta \overline{D}_{E_i}\| - \|\delta \overline{D}_{SC_i}\|] + [\delta \text{RelEff}_{E_i} - \delta \text{RelEff}_{SC_i}] +$$

$$[\beta_{E_i} - \beta_{SC_i}]$$

Alternatively, the geometric representation of phase can be stated in terms of the line of sight and its related errors from Eq. (22) by $$\lambda_i \Delta \Phi_i = \lambda_i(\Delta\phi_i + \Delta N_i) \quad (49)$$

$$\approx [\tilde{n}_{E_i} \cdot (\tilde{D}_i - \tilde{r}_E) - \tilde{n}_{SC_i} \cdot (\tilde{D}_i - \tilde{r}_{SC})] +$$

$$[\overline{\text{RelEff}}_{E_i} - \overline{\text{RelEff}}_{SC_i}] + [c\delta t_E - c\delta t_{SC}] +$$

$$[(\tilde{n}_{E_i} - \tilde{n}_{SC_i}) \cdot \delta \overline{D}_i] + [\tilde{n}_{E_i} \cdot \delta \tilde{r}_E - \tilde{n}_{SC_i} \cdot \delta \tilde{r}_{SC}] +$$

$$[\delta \tilde{n}_{E_i} \cdot (\tilde{D}_i - \tilde{r}_E) - \delta \tilde{n}_{SC_i} \cdot (\tilde{D}_i - \tilde{r}_{SC})] +$$

$$[\delta \text{RelEff}_{E_i} - \delta \text{RelEff}_{SC_i}] + [\beta_{E_i} - \beta_{SC_i}]$$

With the additional assumption that the line of sight is constant throughout the Solar System such that $\tilde{n}_i \approx \tilde{n}_{E_i} \approx \tilde{n}_{SC_i}$, the above representation can be simplified to the following:

$$\lambda_i \Delta \Phi_i = \lambda_i(\Delta\phi_i + \Delta N_i) \quad (50)$$

$$\approx \tilde{n}_i \cdot \Delta \bar{x} + [\overline{\text{RelEff}}_{E_i} - \overline{\text{RelEff}}_{SC_i}] + [c\delta t_E - c\delta t_{SC}] +$$

$$[\tilde{n}_i \cdot (\delta \tilde{r}_E - \delta \tilde{r}_{SC})] + [\delta \tilde{n}_i \cdot \Delta \bar{x}] +$$

$$[\delta \text{RelEff}_{E_i} - \delta \text{RelEff}_{SC_i}] + [\beta_{E_i} - \beta_{SC_i}]$$

The fourth term on the right hand side of Eq. (50) is related to the error in spacecraft position, or $(\delta \tilde{r}_E - \delta \tilde{r}_{SC}) \cong \delta \Delta \bar{x}$. If the position of Earth is accurately known, then the error in Earth position is effectively zero, or $\delta \tilde{r}_E \approx 0$. Thus, this expression simplifies directly to spacecraft position error. Using phase single difference measurements and an estimate of spacecraft position, $\Delta \tilde{x}$, Eq. (50) can be used to solve for any unknown spacecraft position error, $\delta \tilde{r}_{SC}$.

XII. Double Difference

The primary benefit of the single difference computation is the removal of the poorly known pulsar distance, $\overline{D}_i$. Implementing a double difference is also beneficial. A double difference is the subtraction of two single differences from two separate pulsars. This difference removes values that are common to both pulsars, such as navigation system dependent values. However, double differences require observations from multiple sources to be conducted contemporaneously, such that the pulse arrival time measurements from these sources can be computed simultaneously and effectively at the same position of the spacecraft. This may require multiple detectors to be integrated into a single system for full absolute position determination. Otherwise, methods must be employed to adjust arrival times for observations made at different times to the same time epoch.

XIII. Range Double Difference

Figure 7:
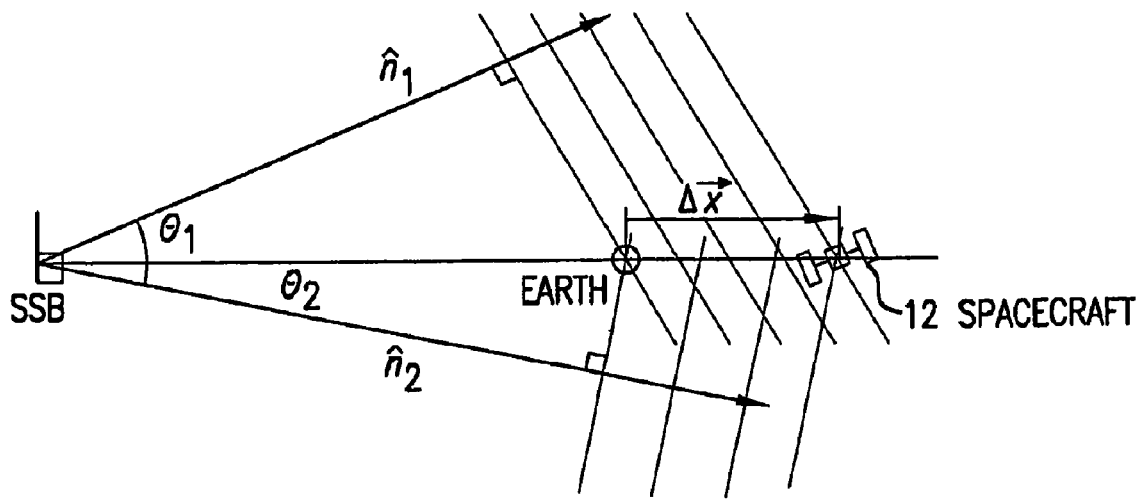
FIG. 7 is a schematic diagram illustrating pulse plane arrivals within the Solar System from two separate sources of pulsed celestial radiation.

The range double difference is computed from data from two sources, the $i^{th}$ and $j^{th}$ pulsars. FIG. 7 provides a diagram of the arriving pulses from two pulsars into the Solar System. As is shown in the Figure, an x-axis is formed by the line between the Earth and the spacecraft 12. The line of sight to a first pulsar is in a direction $\theta_1$ with respect to the x-axis, and is represented by $\hat{n}_1$. The line of sight to a second pulsar is in a direction $\theta_2$ with respect to the x-axis, and is represented by $\hat{n}_2$.

XIII-1. Geometric Considerations

If only the geometric relationship for two pulsar range vectors and the spacecraft position is considered as in FIGS. 5 and 7, the range vector double difference can be expressed as $$\nabla\Delta\bar{\rho}_{ij}=\Delta\bar{\rho}_i-\Delta\bar{\rho}_j=(\bar{\rho}_{SC_i}-\bar{\rho}_{E_i})-(\bar{\rho}_{SC_j}-\bar{\rho}_{E_j}), \quad (51)$$

where the symbol $\nabla$ is used to represent a double difference, and should not be misinterpreted as the gradient operator. From the representation of a range vector single difference from Eq. (33) it can is observed that the range vector double difference equals zero, or, $$\nabla\Delta\bar{\rho}_{ij}=\Delta\bar{\rho}_i-\Delta\bar{\rho}_j=\Delta\bar{x}-\Delta\bar{x}=0 \quad (52)$$

Although the range vector doubled difference is zero, this is not true of the range (scalar) double difference. Since the line of sight vectors are different for each pulsar, the range double difference is not zero. Instead, from a purely geometric point of view, the range double difference using Eq. (35) is $$\nabla\Delta\rho_{ij}=(\rho_{E_i}-\rho_{SC_i})-(\rho_{E_j}-\rho_{SC_j})=(\hat{n}_i-\hat{n}_j)\cdot\Delta\bar{x}. \quad (53)$$

XIII-2. Relativistic Effects

Including the effects of relativity on the light ray path for range single differences as in Eq. (40), the range double difference for two pulsars becomes $$\nabla\Delta\rho_{ij} \approx \begin{array}{c} (\hat{n}_i-\hat{n}_j)\cdot\Delta\bar{x}+[\Delta RelEff_i-\Delta RelEff_j]+ \\ O\left(\frac{1}{D_i}-\frac{1}{D_j}\right). \end{array} \quad (54)$$

XIII-3. Range Double Difference Measurement with Errors

Including the measurement errors for the range single differences, the double difference between two pulsars from Eq. (41) becomes $$\nabla\Delta\rho_{ij} = \begin{bmatrix} \|\tilde{r}_E-\tilde{D}_i\|-\|\tilde{r}_{SC}-\tilde{D}_i\| \\ -\|\tilde{r}_E-\tilde{D}_j\|+\|\tilde{r}_{SC}-\tilde{D}_j\| \end{bmatrix} + \\ [\overline{\Delta RelEff}_i-\overline{\Delta RelEff}_j]+\begin{bmatrix} \|\delta\tilde{r}_E\|-\|\delta\tilde{r}_{SC}\| \\ -\|\delta\tilde{r}_E\|+\|\delta\tilde{r}_{SC}\| \end{bmatrix}+ \\ \begin{bmatrix} \|\delta\overline{D}_{E_i}\|-\|\delta\overline{D}_{SC_i}\| \\ -\|\delta\overline{D}_{E_j}\|+\|\delta\overline{D}_{SC_j}\| \end{bmatrix}+[\Delta\delta RelEff_i-\Delta\delta RelEff_j]+ \\ \begin{bmatrix} \eta_{E_i}-\eta_{SC_i} \\ -\eta_{E_j}-\eta_{SC_j} \end{bmatrix} \quad (55)$$

This expression can be further simplified, since the terms involving Earth location error and spacecraft position error cancel, to produce $$\nabla\Delta\rho_{ij} = \begin{bmatrix} (\|\tilde{r}_E-\tilde{D}_i\|-\|\tilde{r}_E-\tilde{D}_j\|) \\ -(\|\tilde{r}_{SC}-\tilde{D}_i\|-\|\tilde{r}_{SC}-\tilde{D}_j\|) \end{bmatrix} + [\overline{\Delta RelEff}_i-\overline{\Delta RelEff}_j] + \\ \begin{bmatrix} (\|\delta\overline{D}_{E_i}\|-\|\delta\overline{D}_{E_j}\|) \\ -(\|\delta\overline{D}_{SC_i}\|-\|\delta\overline{D}_{SC_j}\|) \end{bmatrix} + [\Delta\delta RelEff_i-\Delta\delta RelEff_j]+[\Delta\eta_i-\Delta\eta_j] \quad (56)$$

If the line of sight vectors are utilized instead, as in Eq. (42), then this range double difference becomes $$\nabla\Delta\rho_{ij} = \quad (57)$$

$$(\hat{n}_i-\hat{n}_j)\cdot\Delta\bar{x}+[\overline{\Delta RelEff}_i-\overline{\Delta RelEff}_j]+\begin{bmatrix} (\|\delta\overline{D}_{E_i}\|-\|\delta\overline{D}_{E_j}\|)- \\ (\|\delta\overline{D}_{SC_i}\|-\|\delta\overline{D}_{SC_j}\|) \end{bmatrix}+ \\ [\Delta\delta RelEff_i-\Delta\delta RelEff_j]+[\Delta\eta_i-\Delta\eta_j].$$

The range double difference of Eqs. (56) and (57) involve differences of small values. It is likely that in practical situations many, if not all, of the differences other than spacecraft position and noise can be ignored.

XIV. Phase Double Difference

Figure 8:
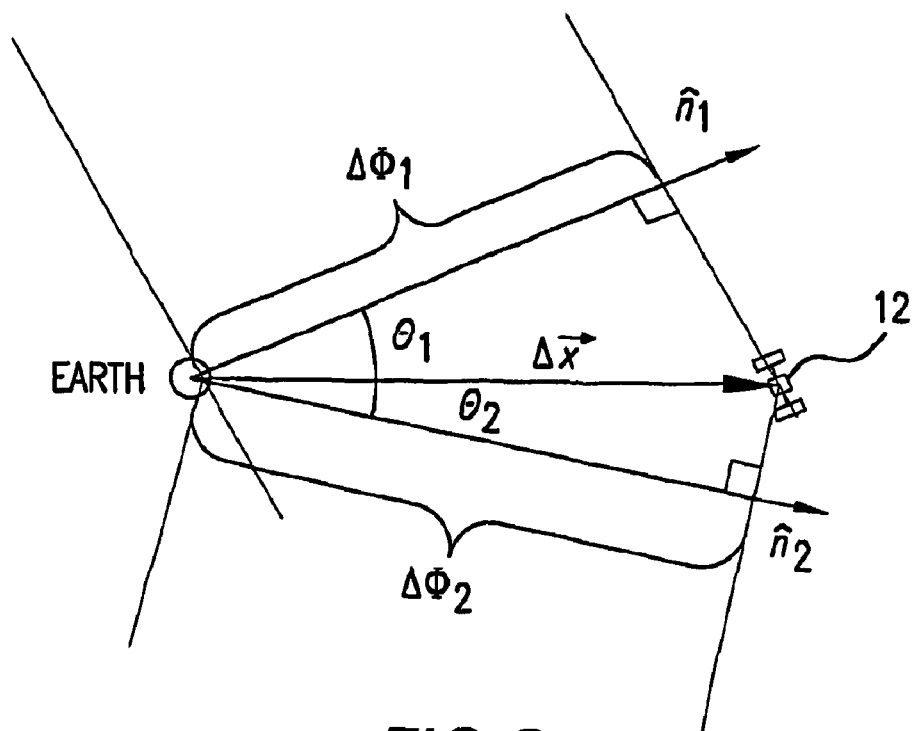
FIG. 8 is a schematic diagram illustrating the phase difference at the Earth and the spacecraft from two separate sources.

As was shown for range, phase double differences can be calculated for the $i^{th}$ and $j^{th}$ pulsars. FIG. 8 provides a diagram of the phase single difference for two pulsars, $\Delta\Phi_1$ and $\Delta\Phi_2$, respectively, which can be subtracted from one another to produce a phase double difference.

XIV-1. Geometric Considerations

The full phase double difference is composed of the fractional phase double difference and the whole cycle double difference is given by $$\nabla\Delta\Phi_{ij}=\Delta\Phi_i-\Delta\Phi_j=\nabla\Delta\phi_{ij}+\nabla\Delta N_{ij}=(\Delta\phi_i+\Delta N_i)-(\Delta\phi_j+\Delta N_j). \quad (58)$$

From FIGS. 6 and 8, the geometric relationship of phase with respect to spacecraft position is given by $$\lambda_i\Delta\Phi_i-\lambda_j\Delta\Phi_j=\lambda_i(\Delta\phi_i+\Delta N_i)-\lambda_j(\Delta\phi_j+\Delta N_j)=(\hat{n}_i-\hat{n}_j)\cdot\Delta\bar{x} \quad (59)$$

or, by dividing through by cycle wavelength, $$\nabla\Delta\Phi_{ij}=\nabla\Delta\phi_{ij}+\nabla\Delta N_{ij}=\left(\frac{\hat{n}_i}{\lambda_i}-\frac{\hat{n}_j}{\lambda_j}\right)\cdot\Delta\bar{x}. \quad (60)$$

XIV-2. Relativistic Effects

Analogous to the range calculations, improved accuracy is attained by including the relativistic effects on the light ray paths from the source. From Eq. (45), the phase difference becomes, $$\lambda_i\Delta\Phi_i-\lambda_j\Delta\Phi_j=\lambda_i(\Delta\phi_i+\Delta N_i)-\lambda_j(\Delta\phi_j+\Delta N_j) \quad (61)$$

$$=\begin{bmatrix} \|\tilde{r}_E-\overline{D}_i\|-\|\tilde{r}_{SC}-\overline{D}_i\|- \\ \|\tilde{r}_E-\overline{D}_j\|+\|\tilde{r}_{SC}-\overline{D}_j\| \end{bmatrix}+ \\ [\Delta RelEff_i-\Delta RelEff_j]$$

If the simplifications to the first term are included as was considered in Eq. (46) and the line of sight is included from Eq. (34), this phase double difference becomes $$\lambda_i\Delta\Phi_i-\lambda_j\Delta\Phi_j=\lambda_i(\Delta\phi_i+\Delta N_i)-\lambda_j(\Delta\phi_j+\Delta N_j) \quad (62)$$

$$\approx(\hat{n}_i-\hat{n}_j)\cdot\Delta\bar{x}+$$

$$[\Delta RelEff_i-\Delta RelEff_j]+O\left(\frac{1}{D_i}-\frac{1}{D_j}\right)$$

or, by dividing through by cycle wavelength this becomes $$\nabla \Delta \Phi_{ij} = \nabla \Delta \Phi_{ij} + \nabla \Delta N_{ij} \quad (63)$$

$$\approx \left(\frac{\hat{n}_i}{\lambda_i} - \frac{\hat{n}_j}{\lambda_j}\right) \cdot \Delta \bar{x} +$$

$$\left[\frac{\Delta RelEff_i}{\lambda_i} - \frac{\Delta RelEff_j}{\lambda_j}\right] + O\left(\frac{1}{\lambda_i D_i} - \frac{1}{\lambda_j D_j}\right)$$

XIV-3. Phase Double Difference Measurement with Errors

From Eq. (47), the phase double difference equation when measurement errors are included becomes $$\lambda_i \Delta \Phi_i - \lambda_j \Delta \Phi_j = \lambda_i(\Delta \phi_i + \Delta N_i) - \lambda_j(\Delta \phi_j + \Delta N_j) \quad (64)$$

$$\approx (\hat{n}_i - \hat{n}_j) \cdot \Delta \bar{x} + [\Delta \overline{RelEff}_i - \Delta \overline{RelEff}_j] +$$

$$\begin{bmatrix} c\delta t_E - c\delta t_{SC} - \\ c\delta t_E + c\delta t_{SC} \end{bmatrix} +$$

$$\begin{bmatrix} \|\delta \bar{r}_E\| - \|\delta \bar{r}_{SC}\| - \\ \|\delta \bar{r}_E\| + \|\delta \bar{r}_{SC}\| \end{bmatrix} +$$

$$\begin{bmatrix} \|\delta \bar{D}_{E_i}\| - \|\delta \bar{D}_{SC_i}\| - \\ \|\delta \bar{D}_{E_j}\| + \|\delta \bar{D}_{SC_j}\| \end{bmatrix} +$$

$$[\Delta \delta RelEff_i - \Delta \delta RelEff_j] +$$

$$[\Delta \beta_i - \Delta \beta_j]$$

Observing the terms within Eq. (64), errors associated with time measurement at spacecraft 12 and Earth cancel, as well as the spacecraft and Earth position errors. Removing these terms yields $$\lambda_i \Delta \Phi_i - \lambda_j \Delta \Phi_j = \lambda_i(\Delta \phi_i + \Delta N_i) - \lambda_j(\Delta \phi_j + \Delta N_j) \quad (65)$$

$$\approx (\hat{n}_i - \hat{n}_j) \cdot \Delta \bar{x} + [\Delta \overline{RelEff}_i - \Delta \overline{RelEff}_j] +$$

$$\begin{bmatrix} \|\delta \bar{D}_{E_i}\| - \|\delta \bar{D}_{SC_i}\| - \\ \|\delta \bar{D}_{E_j}\| + \|\delta \bar{D}_{SC_j}\| \end{bmatrix} +$$

$$[\Delta \delta RelEff_i - \Delta \delta RelEff_j] +$$

$$[\Delta \beta_i - \Delta \beta_j]$$

In terms of phase double difference, the Eq. (64) becomes $$\nabla \Delta \Phi_{ij} = \nabla \Delta \Phi_{ij} + \nabla \Delta N_{ij} \quad (66)$$

$$\approx \left(\frac{\hat{n}_i}{\lambda_i} - \frac{\hat{n}_j}{\lambda_j}\right) \cdot \Delta \bar{x} + \left[\frac{\Delta Re\tilde{l}Eff_i}{\lambda_i} - \frac{\Delta Re\tilde{l}Eff_j}{\lambda_j}\right] +$$

$$\left[(c\delta t_E - c\delta t_{SC})\left(\frac{1}{\lambda_i} - \frac{1}{\lambda_j}\right)\right] +$$

$$\begin{bmatrix} \frac{\|\delta \bar{D}_{E_i}\| - \|\delta \bar{D}_{SC_i}\|}{\lambda_i} - \\ \frac{\|\delta \bar{D}_{E_j}\| - \|\delta \bar{D}_{SC_j}\|}{\lambda_j} \end{bmatrix} +$$

$$\left[(\|\delta \bar{r}_E\| - \|\delta \bar{r}_{SC}\|)\left(\frac{1}{\lambda_i} - \frac{1}{\lambda_j}\right)\right] +$$

-continued $$\left[\frac{\Delta \delta RelEff_i}{\lambda_i} - \frac{\Delta \delta RelEff_j}{\lambda_j}\right] + \left[\frac{\Delta \beta_i}{\lambda_i} - \frac{\Delta \beta_j}{\lambda_j}\right]$$

Alternatively, the geometric representation of phase can be stated in terms of the line of sight and its related errors from Eq. (50) such that the phase double difference becomes $$\lambda_i \Delta \Phi_i - \lambda_j \Delta \Phi_j = \lambda_i(\Delta \phi_i + \Delta N_i) - \lambda_j(\Delta \phi_j + \Delta N_j) \quad (67)$$

$$\approx (\tilde{n}_i - \tilde{n}_j) \cdot \Delta \bar{x} + [\Delta Re\tilde{l}Eff_i - \Delta Re\tilde{l}Eff_j] +$$

$$[(\tilde{n}_i - \tilde{n}_j) \cdot (\delta \bar{r}_E - \delta \bar{r}_{SC})] +$$

$$[(\delta \tilde{n}_i - \delta \tilde{n}_j) \cdot \Delta \bar{x}] +$$

$$[\Delta \delta RelEff_i - \Delta \delta RelEff_j] + [\Delta \beta_i - \Delta \beta_j]$$

If this is represented as phase only, this expression becomes $$\nabla \Delta \Phi_{ij} = \nabla \Delta \Phi_{ij} + \nabla \Delta N_{ij} \quad (68)$$

$$\approx \left(\frac{\tilde{n}_i}{\lambda_i} - \frac{\tilde{n}_j}{\lambda_j}\right) \cdot \Delta \bar{x} + \left[\frac{\Delta Re\tilde{l}Eff_i}{\lambda_i} - \frac{\Delta Re\tilde{l}Eff_j}{\lambda_j}\right] +$$

$$\left[(c\delta t_E - c\delta t_{SC})\left(\frac{1}{\lambda_i} - \frac{1}{\lambda_j}\right)\right] +$$

$$\left[\left(\frac{\tilde{n}_i}{\lambda_i} - \frac{\tilde{n}_j}{\lambda_j}\right) \cdot (\delta \bar{r}_E - \delta \bar{r}_{SC})\right] + \left[\left(\frac{\delta \tilde{n}_i}{\lambda_i} - \frac{\delta \tilde{n}_j}{\lambda_j}\right) \cdot \Delta \bar{x}\right] +$$

$$\left[\frac{\Delta \delta RelEff_i}{\lambda_i} - \frac{\Delta \delta RelEff_j}{\lambda_j}\right] + \left[\frac{\Delta \beta_i}{\lambda_i} - \frac{\Delta \beta_j}{\lambda_j}\right].$$

For most practical systems, the phase double difference of Eqs. (65) or (67) are very beneficial, since the time errors cancel in these representations. However, certain applications may not compute individual phase single differences, but rather direct phase double differences. For those applications, Eqs. (66) or (68) may be used. However, navigation methods based on Eqs. (66) or (68) must retain all terms for accurate position determination as the time errors do not cancel.

XV. Triple Difference

The triple difference is created by subtracting two double differences over time. This difference removes any values that are not time dependent. For a static system or when measurements are made over fairly short periods of time, many of the time independent terms will cancel.

XVI. Range Triple Differences with Errors

The triple difference for range can be computed from Eq. (57) at time $t_1$ and $t_2$ as, $$\nabla \Delta \rho_{ij}(t_2) - \nabla \Delta \rho_{ij}(t_1) \cong \quad (69)$$

$$\{\hat{n}_i - \hat{n}_j\} \cdot [\Delta \bar{x}(t_2) - \Delta \bar{x}(t_1)] + \begin{bmatrix} \nabla \Delta RelEff_{ij}(t_2) - \\ \nabla \Delta RelEff_{ij}(t_1) \end{bmatrix} +$$

$$\begin{bmatrix} \nabla \Delta \delta RelEff_{ij}(t_2) - \\ \nabla \Delta \delta RelEff_{ij}(t_1) \end{bmatrix} + [\nabla \Delta \eta_{ij}(t_2) - \nabla \Delta \eta_{ij}(t_1)]$$

This representation of Eq. (69) assumes that the triple difference of pulsar position error, with respect to Earth and the spacecraft 12, is negligible. The triple difference of the relativistic effect and its errors can also be considered to be very small, so for most applications the range triple difference can be stated as $$\nabla \Delta \rho_{ij}(t_2) - \nabla \Delta \rho_{ij}(t_1) \approx \{\hat{n}_i - \hat{n}_j\} \cdot [\Delta \vec{x}(t_2) - \Delta \vec{x}(t_1)] + [\nabla \Delta \eta_{ij}(t_2) - \nabla \Delta \eta_{ij}(t_1)]. \quad (70)$$

XVII. Phase Triple Difference with Errors

Similarly to the range case described above, a phase triple difference can be computed using Eq. (66). If all the triple differences with respect to relativity effects and its errors, time errors on Earth and the spacecraft 12, and position errors are considered negligible, then the phase triple difference can be written as $$\nabla \Delta \Phi_{ij}(t_2) - \nabla \Delta \Phi_{ij}(t_1) = [\nabla \Delta \phi_{ij}(t_2) - \nabla \Delta \phi_{ij}(t_1)] + \quad (71)$$
$$[\nabla \Delta N_{ij}(t_2) - \nabla \Delta N_{ij}(t_1)]$$
$$\approx \left\{\frac{\hat{n}_i}{\lambda_i} - \frac{\hat{n}_j}{\lambda_j}\right\} \cdot [\Delta \vec{x}(t_2) - \Delta \vec{x}(t_1)] +$$
$$\left[\frac{\Delta \beta_i(t_2) - \Delta \beta_i(t_1)}{\lambda_i} - \frac{\Delta \beta_j(t_2) - \Delta \beta_j(t_1)}{\lambda_j}\right]$$

If the time difference $t_2 - t_1$ is sufficiently short, and the phase cycle is long, then the measurement is made within a single cycle, thus the triple difference from Eq. (71) will be zero, or $[\nabla \Delta N_{ij}(t_2) - \nabla \Delta N_{ij}(t_1)] = 0$. This simplifies the expression, and spacecraft position can be determined using only the fractional phase measurements.

XVIII. Velocity Measurement

Among the beneficial features of the triple difference technique of the present invention is that by subtracting values over time, the difference provides a method for vehicle velocity determination. Rewriting Eq. (71) with the time difference between $t_1$ and $t_2$ as $$\left[\frac{\nabla \Delta \Phi_{ij}(t_2) - \nabla \Delta \Phi_{ij}(t_1)}{t_2 - t_1}\right] = \left[\frac{\nabla \Delta \phi_{ij}(t_2) - \nabla \Delta \phi_{ij}(t_1)}{t_2 - t_1}\right] + \quad (72)$$
$$\left[\frac{\nabla \Delta N_{ij}(t_2) - \nabla \Delta N_{ij}(t_1)}{t_2 - t_1}\right]$$
$$\approx \left\{\frac{\hat{n}_i}{\lambda_i} - \frac{\hat{n}_j}{\lambda_j}\right\} \cdot \left[\frac{\Delta \vec{x}(t_2) - \Delta \vec{x}(t_1)}{t_2 - t_1}\right] +$$
$$\left[\frac{\Delta \beta_i(t_2) - \Delta \beta_i(t_1)}{\lambda_i \{t_2 - t_1\}} - \frac{\Delta \beta_j(t_2) - \Delta \beta_j(t_1)}{\lambda_j \{t_2 - t_1\}}\right]$$

Spacecraft velocity can be introduced as $$\Delta \dot{\vec{x}} = \frac{\Delta \vec{x}(t_2) - \Delta \vec{x}(t_1)}{t_2 - t_1} \quad (73)$$

Creating similar derivatives for phase double difference and phase noise, the triple difference of Eq. (72) becomes $$\nabla \Delta \dot{\Phi}_{ij} = \nabla \Delta \dot{\phi}_{ij} + \nabla \Delta \dot{N}_{ij} \quad (74)$$
$$\approx \left\{\frac{\hat{n}_i}{\lambda_i} - \frac{\hat{n}_j}{\lambda_j}\right\} \cdot \Delta \dot{\vec{x}} + \left[\frac{\Delta \dot{\beta}_i}{\lambda_i} - \frac{\Delta \dot{\beta}_j}{\lambda_j}\right].$$

Certain embodiments of the present invention are operable to determine phase measurements over a period of time, thereby allowing vehicle velocity to be estimated through Eq. (74). If the whole cycle velocity term is zero, or $\nabla \Delta \dot{N}_{ij} = 0$, then the spacecraft velocity can be determined directly from the fractional phase velocity.

XIX. Search Space and Ambiguity Resolution

The previous section provided exemplary methods to determine the position of a spacecraft 12 with respect to the known location of Earth, or any known location, in accordance with certain aspects of the invention. These methods rely on measuring the phase of an arriving pulse at a detector 22 and comparing the measured phase to the phase predicted to arrive at Earth. The predicted phase is determined using a pulse timing model. However, comparing measured and predicted phase of a single pulse does not determine absolute position unless the number of full pulse cycles between these two locations is also known. Since the number of integer phase cycles is not observable in the pulse measurement from a pulsar 16, or they are ambiguous, certain embodiments of the present invention include methods to resolve the position of the vehicle despite the ambiguities so that the absolute position can be determined.

This section describes the pulse phase cycle ambiguity resolution processes. These processes assume that for a given fully-determined set of phase measurements from separate pulsars, there is a single unique position in three-dimensional space that satisfies the measurements of phase from separate pulsars. Thus, only one fully unique set of cycles exists which satisfies the position as determined from the phase measurements. Once this set of cycles is identified, the three-dimensional position can be determined by adding the fractional portion and whole number of phase cycles that are present between Earth and the spacecraft 12.

A solution for the cycle sets can be generated through direct solution methods, which use a linear combination of a subset of measurements. Given a sufficient number of measurements, solutions sets can be created for the unique set of cycles and the absolute position. However, the phase measurements and the position produce an under-determined system (more unknowns than equations). Thus, provisions for establishing initial assumptions on some of the unknowns are implemented by embodiments of the invention.

The solution cycle set may also be selected from a search space, or three-dimensional geometry that contains an array of candidate cycle sets. Each set within a chosen search space is processed and the likelihood of each set being the unique solution is tested. Individual candidates that satisfy processing tests are retained for further evaluation. Using measurements from a sufficient number of pulsars, or by using multiple measurements from a single pulsar, a unique cycle set within the search space may be chosen as the most likely set for the absolute position of the spacecraft 12. Testing each candidate set of cycles within a large search space can be computationally intensive and may require long processing time. However, certain embodiments of the present invention include methods for reducing the search space, or to more quickly remove unlikely candidates therefrom. Additionally, multiple tests of the candidate sets, which help identify likely candidates and thereby improve the efficiency of the selection process, are also implemented by embodiments of the invention. The space reduction methods and selection tests insure that i) the correct solution is guaranteed to be among the potential solutions; ii) the true candidate set lies within the chosen search space; iii) test criteria must account for measurement noise within the system; and iv) any chosen set of cycles must be continually monitored to insure its validity.

The following sections describe methods on initializing the cycle determination process, generating a valid search space, and resolving phase cycle ambiguities. Various options may exist for search space geometry and cycle test characteristics. The exemplary methods described below provide a broad overview of some of these options, while still others will be obvious to the skilled artisan.

XX. Search Space

In certain embodiments of the present invention, the search space is symmetrical about its origin. The origin, or center point, of the search space can be chosen depending on the application and, in certain beneficial embodiments of the invention, is collocated with the model validity location. Since most pulsar timing models exist at the SSB 100, the barycenter is a potential choice as the search space origin. For spacecraft missions studying the Solar System's planets, especially inner planets, the SSB is an appropriate option for the origin. For spacecraft 12 operating within the Earth-Moon system, or in orbit about Earth, Earth's center, or perhaps the Earth-Moon barycenter, is a more useful choice for the search space origin. When a spacecraft 12 is known to be orbiting a planetary body, choosing this body as the origin of the search space significantly reduces the size of the search space over the methods using the SSB as origin. Candidate cycles can exist within the search space on either side of the origin, unless some prior knowledge allows the removal of candidates from one side thereof. The search space could be shifted with respect to the origin if information regarding its shape can be determined.

For spacecraft that have failed for some reason and must implement absolute position navigation in order to solve the vehicle's "lost in space" problem, another suitable choice for the search space origin is the vehicle's last known position. This position could, for example, be stored routinely in backup memory onboard the vehicle. This provides the ambiguity resolution process and its search space definition a much better prediction of where the vehicle could be, rather than starting the process entirely over and using the SSB as the origin.

From an operational point of view, any known location can be utilized as the search space origin, since only known locations are valid for defining the pulse timing model. However, the origin should be chosen in the most prudent manner given the vehicle's situation and application.

Figure 9:
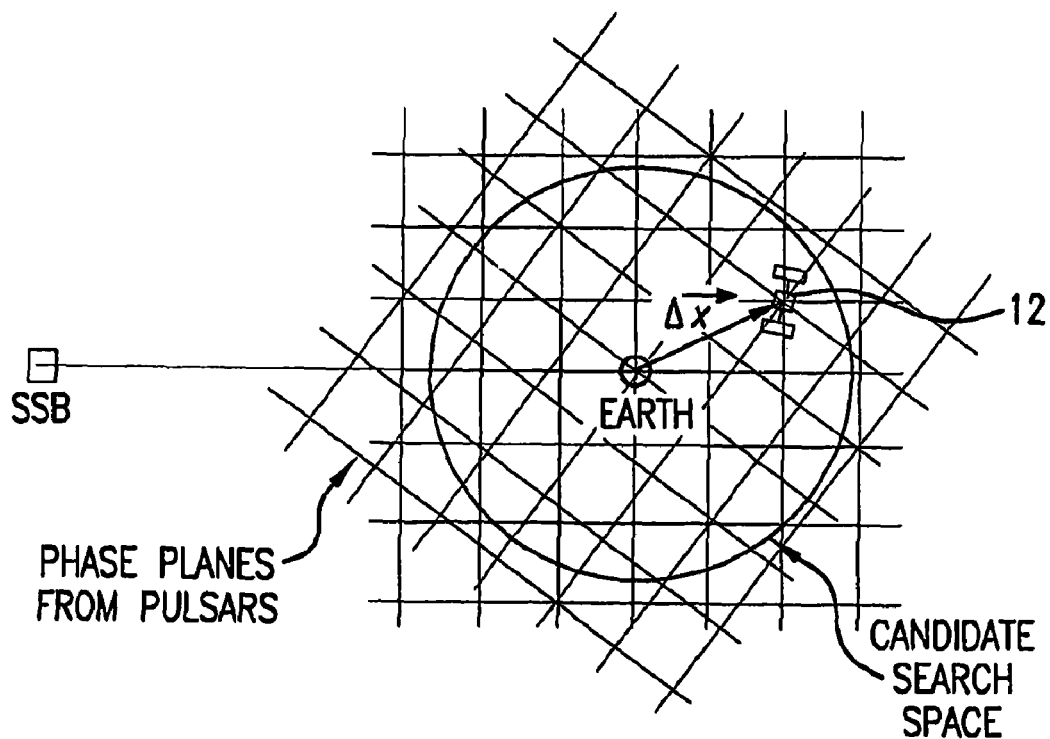
FIG. 9 is a schematic diagram illustrating the phase cycle candidate search space, centered about the Earth.

FIG. 9 shows a diagram of a candidate cycle search space. The SSB, Earth, and spacecraft positions are shown, and arriving pulse phase planes are diagramed arriving from four different pulsars. The spherical geometry search space is shown as centered about Earth. The only candidate set of cycles within the search space that has all phase planes crossing in one location is the true location of the spacecraft 12.

XX-1. Geometrical Space

A straightforward method of developing a cycle search space is to place a three dimensional geometrical boundary about the origin. Options for shapes include a sphere of specified radius, a cube of specified dimensions, or an ellipsoid, perhaps about the planet's equatorial plane. The dimensions of the search space geometry, centered about the chosen origin, define the candidate cycles along the line of sight vector to each pulsar. The search space candidate sets are only those that lie within this physical boundary.

XX-2. Phase Cycle Space

A search space can be defined as a fixed number of cycles along the line of sight for a pulsar 16. The number of cycles considered can be specific to each pulsar. For example a choice of ten cycles on each side of the origin could be selected for a pulsar. If the pulse cycles are sufficiently different in this space creation, care must be taken in order to ensure that the true cycle set is maintained within the search space.

XX-3. Covariance Space

Given a set of pulsar phase measurements and the corresponding measurement noise associated with each measurement, a search space can be created that is defined by the covariance matrix of the measurements. The covariance matrix will skew the search space based on the magnitudes of the errors. This method is similar to the Geometrical Space method, however the Covariance Space shape is ellipsoidal oriented along the eigenvectors of the covariance matrix.

Once a search space has been generated, it is possible to reduce the number of sets to be searched by removing those sets that are known to exist inside a planetary body. Obviously, the spacecraft 12 could not be physically located inside these bodies, so there is no need to test these candidate sets. Sets within the sphere of the Sun, Earth, or any planetary body, can be immediately removed from the search space. For applications in planetary orbits, such as low-Earth orbits, this may significantly reduce the number of candidates that must be tested.

XXI. Candidates

The candidate cycle sets within a search space are defined by the single, double, or triple differences as developed in the "Measurement Differences" section above. Given a set of phase measurements, from predicted phase arrivals at a known model reference location and detected arrivals at the spacecraft position, there is only one set of phase cycles that uniquely corresponds to the combination of data. The search space essentially contains an array of cycles defined to be in the vicinity of this true set. Each possible cycle combination within this search space can be identified in the array and tested to determine whether accurate spacecraft position has been resolved.

As an example, the phase single difference of Eq. (44) defines the relationship between fractional phase difference, $(\Delta\phi_i)$, phase whole cycle difference, $(\Delta N_i)$, and spacecraft position, $(\Delta\bar{x})$, for a single pulsar. If the phase difference is measured and the whole cycle difference is known a priori, then the spacecraft position along the line of sight to that pulsar, $(\hat{n}_i \cdot \Delta\hat{x})$, may be directly computed from this equation. However, if $\Delta N_i$ is not known a priori, and supposing a search space of ten cycles is chosen, then each of the ten different cycles could be selected as the potential cycle value that defines the spacecraft location. By utilizing measurements from additional pulsars, each set of potential cycles from each pulsar can be processed to establish which set solves uniquely for the combination of phase measurements and spacecraft location. Only one unique set of cycles can solve for the true three-dimensional spacecraft location.

This process could easily be extended for double or triple differences by using Eqs. (60) and (71), respectively. If the phase double differences are measured, then there exists one set of cycle double differences that solves for the unique spacecraft location. Appropriately, a search space that contains the entire array of possible cycle double differences can be generated, and each combination of cycles within this space can be tested for its validity.

Figure 10:
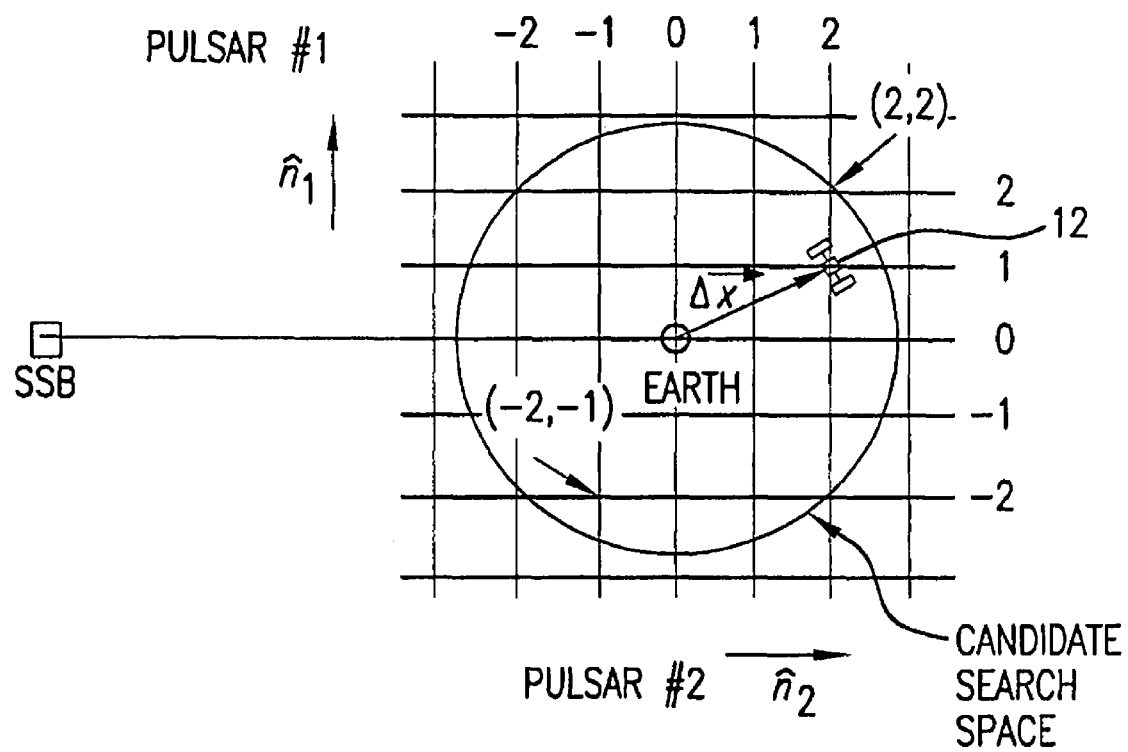
FIG. 10 is a schematic diagram illustrating the phase cycle search space, containing candidate cycle sets, centered about the Earth.

FIG. 10 shows an elementary cycle set from two orthogonally located pulsars. Several phase cycle single differences are labeled, such as $(\Delta N_1, \Delta N_2)=(2,2)$ and $(\Delta N_1, \Delta N_2)=(-2, -1)$. The true spacecraft position happens to be located at the intersection of phase planes 1 and 2, or $(\Delta N_1, \Delta N_2)=(1,2)$.

XXII. Cycle Ambiguity Resolution

Accurate spacecraft absolute position determination requires precise phase measurements at the spacecraft detectors, thorough pulse timing models at the reference location, and resolution of the ambiguous phase cycles between the spacecraft 12 and the reference location. The phase cycle ambiguity resolution process determines these unknown phase cycles, which match the measured phase data.

Three resolution methods are presented below to exemplify aspects of the present invention. Each method may have advantages for specific applications, and some are much less processing intensive than the others. The Batch, or Least Squares, method directly solves for cycle ambiguities based upon input measurements. Processing is fairly simple, but requires intelligent pre-processing, and inaccurate measurements can lead to widely erroneous results. The Floating-Point Kalman Filter method generates a floating point estimate of the integer cycle ambiguity set as produced by an observing Kalman filter (or similar observation filter). Somewhat process intensive, this method may require large amounts of measurement data, spread over time, in order to resolve the correct ambiguity set. The Search Space Array method exhaustively tests each potential cycle set that exists within a generated search space. Although process intensive if large amount of candidate sets exist within a search space, this method can correctly resolve the cycle ambiguities through well-chosen selection tests.

XXIII. Batch (Least Squares) Resolution

This Batch method assembles a set of phase measurements from separate pulsars to simultaneously and instantly solve for spacecraft position and phase cycle ambiguities. A straightforward Least Squares method may be implemented, or perhaps an enhanced Weighted Least Squares method using the weights of the phase measurement accuracies.

To sufficiently solve for the three-dimensional position and cycle ambiguities, some intelligent pre-processing of pulsar data must be implemented. This is required since even with measurements from several pulsars, the linear system of equations is under-determined (more unknowns than available equations). Reducing the number of unknown variables creates a fully determined system.

Any of the single, double, or triple differences may be utilized in the Batch resolution process. Additionally, system errors may be determined. However, adding capabilities to estimate errors also increases the number of unknowns.

From the phase single difference, Eq. (44) may be placed in linear form for a single pulsar as $$\Delta \phi_i = \begin{bmatrix} \frac{\hat{n}_i}{\lambda_i} & -1 \end{bmatrix} \begin{bmatrix} \Delta \bar{x} \\ \Delta N_i \end{bmatrix}. \tag{75}$$

Small errors that may exist for this equation have been ignored. This single equation has one measurement, $\Delta \phi_i$, and four unknowns—three from the position vector, $\Delta \bar{x}$, and one from the single phase cycle unknown, $\Delta N_i$. Assembling phase measurements from k pulsars, this equation becomes $$\begin{bmatrix} \Delta \phi_1 \\ \Delta \phi_2 \\ \vdots \\ \Delta \phi_k \end{bmatrix} = \begin{bmatrix} \frac{\hat{n}_1}{\lambda_1} & -1 & 0 & \cdots & 0 \\ \frac{\hat{n}_2}{\lambda_2} & 0 & -1 & \cdots & 0 \\ \vdots & \vdots & \vdots & \ddots & \vdots \\ \frac{\hat{n}_k}{\lambda_k} & 0 & 0 & \cdots & -1 \end{bmatrix} \begin{bmatrix} \Delta \bar{x} \\ \Delta N_1 \\ \Delta N_2 \\ \vdots \\ \Delta N_k \end{bmatrix}. \tag{76}$$

This system has k equations and k+3 unknowns, which is an under-determined system. At least three unknowns must be estimated prior to attempting to solve this equation. Any prior knowledge that allows an estimate of enough unknowns to reduce the system to be fully-determined may be utilized and the availability and type of such varies by application.

In certain embodiments of the present invention, certain pulsars are selected that support this method of cycle estimation. When trying to determine spacecraft position, for example, the knowledge of the vehicle's mission may provide insight into an estimation of its location. For example, consider a spacecraft within a geosynchronous orbit of Earth (radius=42,200 km). If observation pulsars are selected that have a cycle period of greater than 0.28 s (=2*42,200/c), then modulated signals received from these specific pulsars are not ambiguous as to the cycle within the orbit radius, as only one cycle exists in the volume defined by this radius.

In that a phase difference measurement may have ambiguous polarity, or sign, certain embodiments of the invention assume at least one single cycle difference ($\Delta N=1$) for specific pulsars for purposes of reducing the number of unknowns. A minimum of three pulsars with are then chosen having sufficiently large period to justify the assumption of cycle difference. With the three values then known, the system of equations becomes $$\begin{bmatrix} \Delta \phi_1 \\ \Delta \phi_2 \\ \vdots \\ \Delta \phi_{k-3} \\ \Delta \phi_{k-2} + \Delta N_{k-2} \\ \Delta \phi_{k-1} + \Delta N_{k-1} \\ \Delta \phi_k + \Delta N_k \end{bmatrix} = \begin{bmatrix} \frac{\hat{n}_1}{\lambda_1} & -1 & 0 & \cdots & 0 \\ \frac{\hat{n}_2}{\lambda_2} & 0 & -1 & \cdots & 0 \\ \vdots & \vdots & \vdots & \ddots & \vdots \\ \frac{\hat{n}_{k-3}}{\lambda_{k-3}} & 0 & 0 & \cdots & -1 \\ \frac{\hat{n}_{k-2}}{\lambda_{k-2}} & 0 & 0 & \cdots & 0 \\ \frac{\hat{n}_{k-1}}{\lambda_{k-1}} & 0 & 0 & \cdots & 0 \\ \frac{\hat{n}_k}{\lambda_k} & 0 & 0 & \cdots & 0 \end{bmatrix} \begin{bmatrix} \Delta \bar{x} \\ \Delta N_1 \\ \Delta N_2 \\ \vdots \\ \Delta N_{k-3} \end{bmatrix}, \tag{77}$$

where $\Delta N_k$, $\Delta N_{k-1}$ and $\Delta N_{k-2}$ are the known cycle difference values. The new system of equations has k equations and k unknowns and can be rewritten as $$[\Delta \bar{\phi}] = H \begin{bmatrix} \Delta \bar{x} \\ \Delta \bar{N} \end{bmatrix}. \tag{78}$$

The H matrix, composed of the terms from Eq. (78), is referred to as the measurement matrix. The system of Eq. (78) can be solved using known Least Squares techniques. In accordance with known practice, $$\begin{bmatrix} \Delta \vec{x} \\ \Delta \vec{N} \end{bmatrix} = (H^T H)^{-1} (H^T) [\Delta \vec{\phi}]. \tag{79}$$

In certain embodiments of the invention, a weighting matrix, W, representing the covariance estimate of accuracies for each measurement is incorporated by, $$[\Delta \vec{\phi}] = WH \begin{bmatrix} \Delta \vec{x} \\ \Delta \vec{N} \end{bmatrix}. \tag{80}$$

The solution to the weighted equation is then $$\begin{bmatrix} \Delta \vec{x} \\ \Delta \vec{N} \end{bmatrix} = [(WH)^T (WH)]^{-1} (WH)^T [\Delta \vec{\phi}]. \tag{81}$$

Thus, using either Eqs. (79) or (81), a Batch solution of vehicle position and unknown cycle ambiguities can be determined. This method is relatively simple to implement and only limited processing is required. Navigation data $\Delta \vec{x}$ and $\Delta \vec{N}$ are available as soon as sufficient measurements have been obtained. In certain embodiments of the invention, the process is extended to use the error equation for a phase single difference of Eq. (50), where estimates to the error terms are available. Alternatively, more equations (or measurements) may be incorporated to allow a solution to the system of equations with the additional unknown variables.

In alternative embodiments, the Batch process is extended to utilize the phase double or triple differences. As shown previously, computing double or triple differences ameliorates errors associated with each phase measurement. However, the additional differences reduce the number of independent equations within a system. For a system of k measurements, a double difference system has only k−1 equations with k+2 unknowns, and a triple difference system has only k−2 equations with k+1 unknowns. Methods of the invention so embodied include estimation of selected unknowns in manners similar to that described above.

XXIV. Floating-Point Kalman Filter Resolution

In the Kalman Filter resolution method of the present invention, an analytical filter is developed that estimates the state variables of spacecraft position and phase cycle using measurements of phase differences. The Kalman filter is a well-known recursive state estimator that relies on adequate models of the behavior of each state variable over time, the state dynamics, and sufficient representation of the state variable's relationship to the observed measurements. Process noise associated with the state dynamics and measurement noise associated with each measurement are accounted for in the Kalman filter process. Estimates of state variables and the error covariance matrix associated with the state variables are products of the filtering process, where the error covariance matrix provides an estimate of the accuracy of the state estimation.

The Kalman filter of the present invention is constructed from a state space representation known in the art having the spacecraft position and the cycle ambiguities being the state variables. The phase differences are provided to the filter as the observations. The temporal dynamics of each state may be represented over time with a model of such dynamics, or if the measurements are produced over a sufficiently-short amount of time, the state can be approximated as temporally static. Although the phase cycle differences are integer values, these terms are estimated as floating-point (real) values within the Kalman filter.

In certain embodiments of present invention, the Kalman filter incorporates triple differences to determine spacecraft velocity as well as position. Using Eq. (74), the velocity state is added to the filter and estimated using phase triple differences. This would assist with any unknown vehicle dynamics. Once sufficient measurements have been processed such that the values remain stable, these floating point estimates can be rounded to the nearest integer.

The Kalman Filter resolution method of the present invention sequentially processes measurements to update the solution as data become available. Contrastingly, in the Batch processing technique, a solution is obtained all at once. Thus, the Kalman filter method is slower to converge on a solution, albeit that the solution provided may be more accurate than that of the Least Squares method.

In certain embodiments of the present invention, the Kalman filter is implemented as an error-state filter, where state variables thereof are the associated errors of navigation states, such as error in position being the tracked state, as opposed to position being the state. Since some errors may be non-linear, extended forms of the Kalman filter algorithms known in the art may be implemented to process such error states.

XXV. Search Space Array Resolution

The methods previously described solve for the navigation data as a direct consequence of the processing steps thereof. The Search Space Array method of the present invention selects a candidate set of cycles and determines whether this set provides an accurate position solution. This method exhaustively tests all possible candidates for the most likely set, and is consequently process intensive. However, testing all possible candidate sets within a predetermined search space assures that the correct solution set will be tested. As previously discussed in the Search Space section above, the choice of search space may reduce the required processing to less intensive levels by limiting the number of candidate sets, and still be chosen such that the correct solution lies within the search space.

As shown in FIGS. 9 and 10, the search space in certain embodiments of the invention is essentially a geometric grid of candidate cycles from each observed pulsar. Every possible grid point is evaluated within the search space in order to determine which point is the most likely candidate cycle set for the combined pulse phase difference measurements and the spacecraft position.

In order to evaluate each candidate cycle set, a comprehensive test, or series of tests, of the candidate's validity and accuracy is performed. For example, from Eq. (44), a phase single difference for the $i^{th}$ pulsar, from the measured phase difference, $\Delta\phi_i$, and a chosen set of cycle differences, $\Delta\tilde{N}_i$, the spacecraft position along the line of sight for the pulsar can be solved for using $$\hat{n}_i \cdot \Delta \vec{x} = \lambda_i (\Delta\phi_i + \Delta\tilde{N}_i). \tag{82}$$

Given a set of at least three pulsars, the measurements can be assembled as, $$\begin{bmatrix} \hat{n}_1 \\ \hat{n}_2 \\ \hat{n}_3 \end{bmatrix} \Delta \tilde{x} = H \Delta \tilde{x} = \begin{bmatrix} \lambda_1(\Delta\phi_1 + \Delta\tilde{N}_1) \\ \lambda_2(\Delta\phi_2 + \Delta\tilde{N}_2) \\ \lambda_3(\Delta\phi_3 + \Delta\tilde{N}_3) \end{bmatrix}. \quad (83)$$

The spacecraft position can then be solved for using, $$\Delta \tilde{x} = [(H^T H)^{-1} H^T] \begin{bmatrix} \lambda_1(\Delta\phi_1 + \Delta\tilde{N}_1) \\ \lambda_2(\Delta\phi_2 + \Delta\tilde{N}_2) \\ \lambda_3(\Delta\phi_3 + \Delta\tilde{N}_3) \end{bmatrix}. \quad (84)$$

Using this value for a spacecraft position, any additional pulsars (j>3) can have their cycle ambiguities directly solved for by $$\Delta \tilde{N}_j = \text{round}\left(\frac{\tilde{n}_j}{\lambda_j} \cdot \Delta \tilde{x} - \Delta\phi_j\right), \quad (85)$$

where the "round" function rounds the floating-point expression within the parentheses to the nearest integer.

A residual test can be determined using these new estimated cycle ambiguities as $$v_j = \frac{\tilde{n}_j}{\lambda_j} \cdot \Delta \tilde{x} - \Delta\phi_j - \Delta \tilde{N}_j. \quad (86)$$

If more than one additional observed pulsar is available, then a vector of these residual tests can be produced:

$$v = \begin{bmatrix} v_j \\ v_{j+1} \\ \vdots \\ v_k \end{bmatrix} = \begin{bmatrix} \frac{\tilde{n}_j}{\lambda_j} \cdot \Delta \tilde{x} - \Delta\phi_j - \Delta \tilde{N}_j \\ \frac{\tilde{n}_{j+1}}{\lambda_{j+1}} \cdot \Delta \tilde{x} - \Delta\phi_{j+1} - \Delta \tilde{N}_{j+1} \\ \vdots \\ \frac{\tilde{n}_k}{\lambda_k} \cdot \Delta \tilde{x} - \Delta\phi_k - \Delta \tilde{N}_k \end{bmatrix}. \quad (87)$$

The magnitude of this residual vector provides an estimate of the quality of the computed spacecraft position, $\Delta \tilde{x}$, $$\sigma_v = \text{norm}(\bar{v}) \quad (88)$$

Each candidate set within a search space can be evaluated using the test statistic, $\sigma_v$. If a chosen set does not match well with the measured phase difference and spacecraft position, then the value of residual $\sigma_v$ will be large. Likewise, if the chosen set does match well, then the difference for each extra observable pulsar from Eq. (87) will be small and consequently, the magnitude of the residual vector will be small. In certain embodiments of the present invention, a threshold for the residual magnitude is chosen to remove many, if not all, of the candidate sets other than the specific candidate set that represents the true spacecraft position. If the residuals of several candidate sets remain below a chosen threshold, additional measurements from pulsars may be used to eliminate the wrong sets. In certain embodiments, additional information is added, such as by obtaining data from additional pulsars, until the solution set of pulses is identified and the absolute position of the spacecraft 12 will be determined therefrom.

As was shown within the Batch resolution process, weighting of individual pulsars can be used to assist in determining an estimated vehicle position. Incorporating a weighting matrix to Eq. (83), the spacecraft position solution of Eq. (84) becomes $$\Delta \tilde{x} = [(WH)^T (WH)]^{-1} (WH)^T \begin{bmatrix} \lambda_1(\Delta\phi_1 + \Delta\tilde{N}_1) \\ \lambda_2(\Delta\phi_2 + \Delta\tilde{N}_2) \\ \lambda_3(\Delta\phi_3 + \Delta\tilde{N}_3) \end{bmatrix} \quad (89)$$

Weights may also be included in the residual calculation of Eq. (87). Incorporating weights into these measurements is particularly useful when a subset of the set of pulsars is more accurately measurable than other pulsars in the set.

In certain embodiments of the present invention, the residual vector defined in Eq. (87) is extended to include double and/or triple phase and cycle differences. The discussions above describing these differences have shown that the number of error terms is reduced when using higher order differences. However, because these higher order differences are evaluated using differences of close or similar values, developing a test statistic threshold that sufficiently removes unwanted candidate sets and retains the correct candidate set becomes increasingly difficult. Thus, certain embodiments of the invention implement combined-order systems, where candidate set evaluation is performed at multiple orders of differencing to assist in selecting the correct cycle set.

Additional tests may be conducted to assist in removing unwanted candidate sets. For example, if any dynamics of the vehicle is known during an observation time, such as through external sensors 38 or supplemental sensors 39, that information can be used to determine how cycles at subsequent vehicle positions behave with respect to current cycle estimates. In certain embodiments of the invention, the Batch method results are compared with the Search Space Array results, using the assumed correct set of cycles, to test the validity of cycle and spacecraft position.

Figure 14:
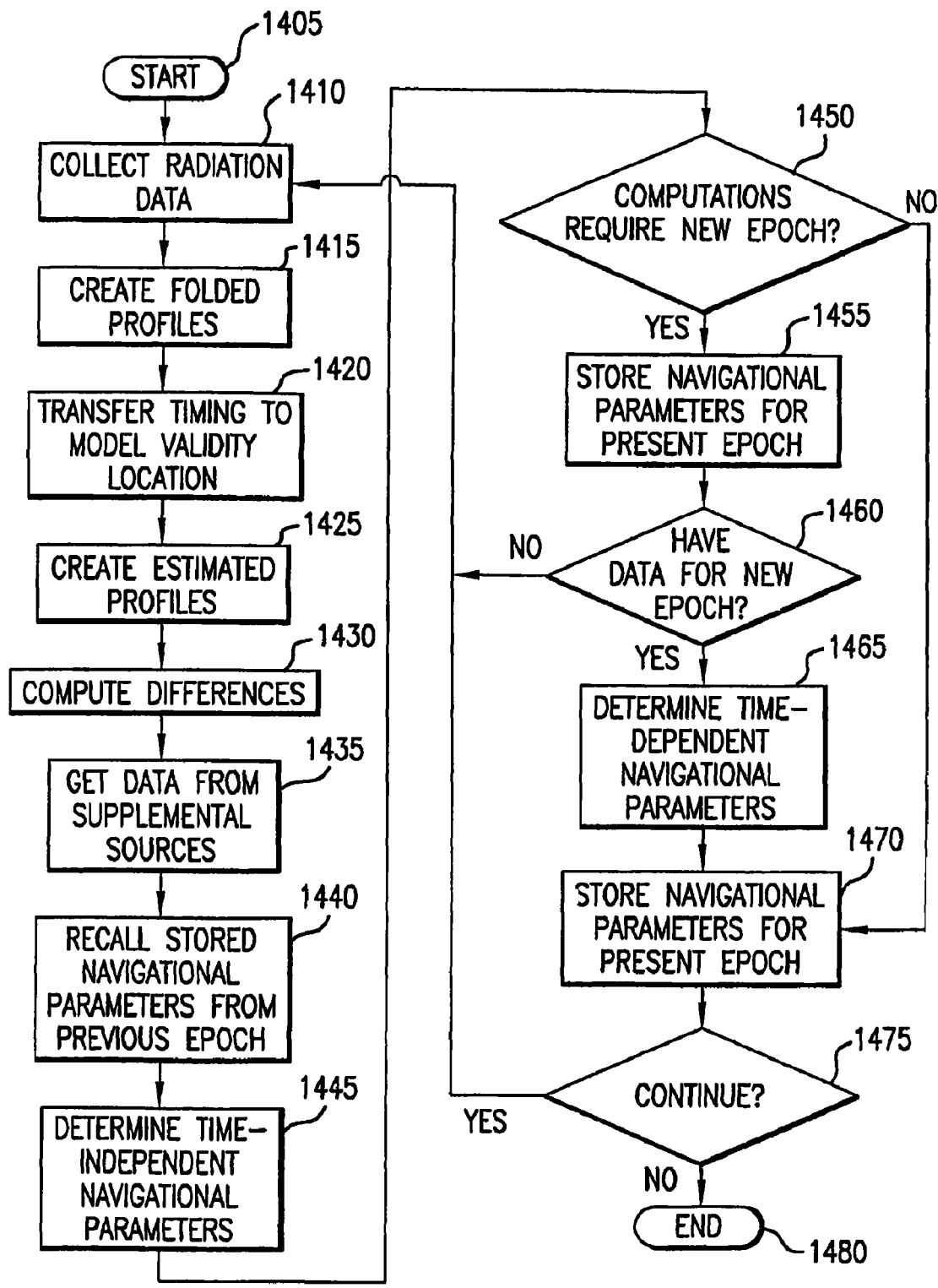
FIG. 14 is a flow diagram illustrating fundamental methods steps of certain embodiments of the present invention.

A flow diagram illustrating, in broad overview, exemplary method steps of certain embodiments of the present invention is depicted in FIG. 14. As is shown in the Figure, the process begins at start block 1405, whereupon flow is transferred to block 1410. At block 1410, radiation data are collected by one or more radiation detectors 22a-22x. The incoming data are synchronously integrated to create folded profiles, as shown at block 1415. Flow is then transferred to block 1420, where times of arrival of certain states of the radiation, such as phase or pulse peak arrival time, are transferred to the timing model validity location. At block 1425, the transferred time is provided to the timing model, and estimated profiles for the model location are created. The differences between the measured data and the estimated data are determined in block 1430, where such differences are differences in, for example, phase or range, and may be, for example, single, double or triple differences, as described above.

Supplemental data from external sources 38 and supplemental sources 39 may be retrieved, as shown in block 1435, and previously determined navigation data may be recalled from memory, as shown at block 1440. These data are incorporated to improve the accuracy of the resulting navigational data and to provide initializing data such as providing the last known location of the vehicle 12. Then, using all available data from blocks 1430, 1435 and 1440, time-independent navigational parameters, such as location of the vehicle 12, are determined, as shown at block 1445.

As is shown in the Figure, once the time-independent navigational parameters have been computed, flow is transferred to decision block 1450, where it is determined if computations require data from a new time epoch. If so, flow is transferred to block 1455, where the time-independent navigational parameters are stored for the present epoch. If the data for the new epoch have not been obtained, as determined at decision block 1460, the method continues at block 1410. Once the data for the new epoch have been obtained, flow is transferred to block 1465, where the time-dependent navigational parameters, such as velocity, are calculated. The navigational parameters for the current epoch are then stored, as shown at block 1470. Flow is transferred to block 1470 also when it is determined at block 1450 that time-dependent computations are not required. It is then determined, at block 1475, whether the method is to continue, which, if so, flow is transferred to block 1410 and, if not, the method is terminated at block 1480.

XXVI. Relative Position

The preceding discussions have described exemplary methods to determine a spacecraft's absolute position within an inertial frame in accordance with aspects of the present invention. A known reference location is chosen within this frame and an offset position with respect to the reference location is determined from methods of the invention. The spacecraft's absolute position is then the sum of the reference position and the offset position. Some applications, however, may only require knowledge of relative position, or the position relative to a location that is not fixed. This relative, or base station location may be the position of another vehicle or any object that the spacecraft 12 uses as a relative reference. Since the base station's location is not generally known by the spacecraft 12 at any given instance, the location of the reference object must be transmitted to the spacecraft 12 when navigation data are needed. Thus, embodiments of the present invention provide means for communication between the base station and the spacecraft 12.

Figure 12:
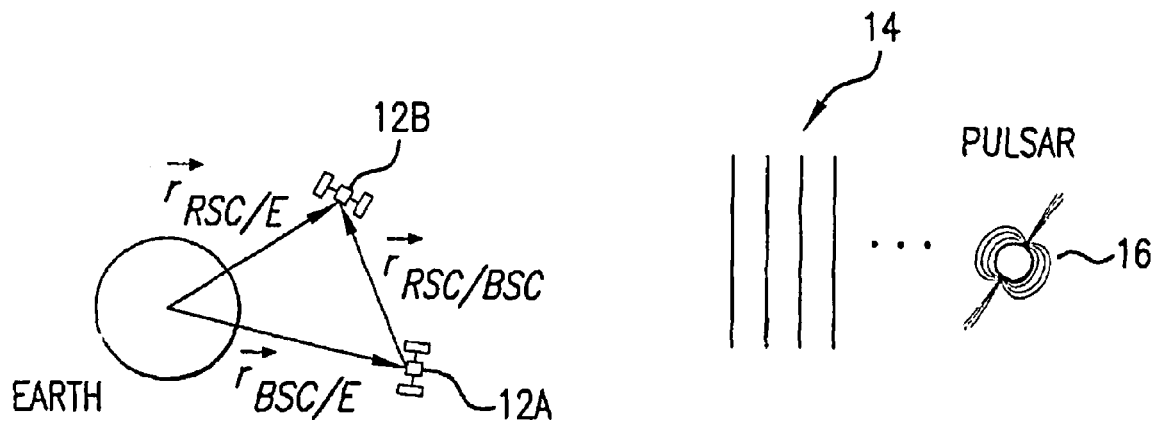
FIG. 12 is a schematic diagram illustrating relative navigation showing two spacecraft receiving pulses from pulsars and communicating pulse arrival time information between them.

In certain embodiments of the invention, the base station is also outfitted with a detector, similar to that installed on the spacecraft 12. In such systems, a direct phase measurement difference can be computed circumventing the requirement of a pulse timing model. If a pulse timing model is used to calculate the spacecraft 12 position, the base station must transmit its location so that the inertial-based timing model on-board the spacecraft 12 can be transferred to the base station's location. If full detector information can be transmitted from the base station, then a model is not required, since direct phase differences can be calculated. FIG. 12 provides a diagram of the relative navigation concept with a base station spacecraft and a single remote spacecraft. If base vehicle 12A knows its location $\bar{r}_{BSC/E}$, it can transmit that location to the remote spacecraft 12B. Additionally, the location $\bar{r}_{RSC/BSC}$ of remote spacecraft 12B relative to base spacecraft 12A may be known. The unknown location of the remote spacecraft 12B with respect to Earth, $\bar{r}_{RSC/E}$ may be determined by the methods described above, with the inclusion of the relative locations being added. Communication between the remote spacecraft and the base station, as well as contemporaneously measured pulse arrival times, allows relative navigation of the vehicles.

Relative navigation procedures require more processing due to the extra communication requirement. Additionally, the system operates with reference to a dynamically locatable platform as opposed to a static reference location, which, complicates the time alignment of the measurement data.

Relative navigation finds applicability in multiple spacecraft formation flying, a spacecraft docking with another vehicle, or a rover operating on a planetary body with respect to its lander's base station. Alternatively, a base station satellite can be placed in Earth orbit and broadcast its location information. Spacecraft within the base station's vicinity or within communication contact can use the broadcast information to compute a relative position solution. Certain embodiments of the relative navigation method of the present invention may provide improved accuracy over the absolute position method, since the base station can provide real-time updates of pulsar pulses. If accurate base station navigation information is known, then computing a relative navigation solution at the spacecraft 12 with respect to the base station also allows the spacecraft to compute its own absolute position.

XXVII. Vehicle Attitude Determination

Certain embodiments of the relative position determination method of the present invention calculates the position of two pulsar detectors 22 affixed to the same spacecraft 12. Determining the position of one detector relative to another on the vehicle allows the determination of vehicle attitude, or orientation. In such vehicle attitude determining configuration, integer cycle ambiguity resolution is not required, since even the shortest known pulsar period corresponds to wavelengths that are much larger than most, if not all, spacecraft (pulse period=0.00156 s=>467 km), thus the detectors are always within a single cycle of each other. Additionally, the separation between the two detectors is set upon installation on the vehicle and thereby known. Once the phase difference is determined for the same pulse at each detector, only the angle, θ, along the line of sight to the pulsar needs to be determined.

Figure 13:
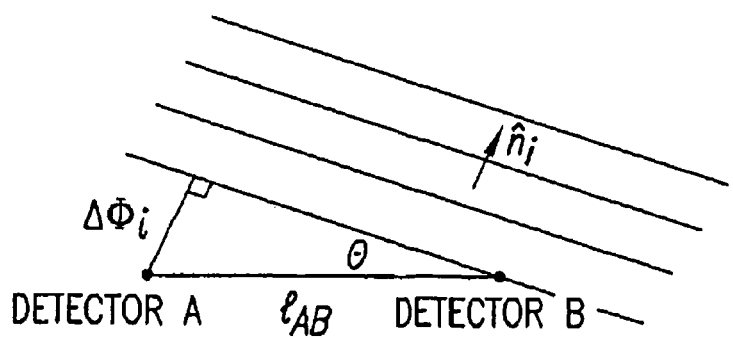
FIG. 13 is a schematic diagram illustrating the arrival of pulses at two separated detectors affixed to the same vehicle to determine attitude of the vehicle.

Referring to FIG. 13, there is shown an orientation of the baseline, $1_{AB}$, between two detectors, detectors A and B, which could correspond to two of detectors 22a-22x of FIG. 11, mounted on the same spacecraft 12 relative to the incoming pulse planes from a pulsar 16. The angle θ is related to the phase difference and the baseline length as, $$\sin(\theta) = \frac{\Delta \Phi_i}{l_{AB}} \tag{90}$$

The baseline between the two detectors and the error in determining the relative position determines the potential accuracy of such an attitude system. Assuming the pulse time of arrival can be determined to within 1 ns for each detector, then attitude accuracy of 0.5° requires a baseline length of 33 m. This dimension is not outside the realm of applicability in that solar sails capable of accommodating detectors so spaced are presently contemplated in the art.

Unlike GPS and GLONASS, it is difficult to track the carrier signal of pulsars. This may be possible at the radio wavelengths, but would be complicated at the optical and X-ray wavelengths since accumulation of individual photons to form a pulse profile requires integration over time. Thus, in certain embodiments of the invention, attitude determination is computed occasionally, such as when time-of-arrival measurements are made. Blending the attitude data acquired via the invention with data from other onboard attitude sensors, such as gyros, supplements a spacecraft's navigation mechanisms to enhance overall performance and reliability.

XXVIII. Solution Accuracy

Certain embodiments of the invention provide, upon completion of the computation, an estimate of the accuracy of the position solution. The accuracy estimate provides a measure of how close the computed solution is to the true vehicle position. The Kalman Filter and Search Space Array methods provide accuracy estimates as part of their processing. Several additional methods for determining position accuracy estimates are possible, such as those discussed below.

XXIX. Position Covariance

The covariance of position uses the expectation operator, E, as $$\text{covariance(position)} = \text{cov(position)} = E(\Delta \bar{x} \cdot \Delta \bar{x}^T). \tag{91}$$

The relationship of position to the measured range to each pulsar is from Eq. (35) as $$\Delta \rho_i = \hat{n}_i \cdot \Delta \bar{x}. \tag{92}$$

Creating a vector of such measurements from j pulsars, Eq. (92) becomes $$\overline{\Delta \rho} = \begin{bmatrix} \hat{n}_1 \\ \hat{n}_2 \\ \vdots \\ \hat{n}_j \end{bmatrix} \Delta \bar{x} = H \Delta \bar{x}. \tag{93}$$

It should be noted that the symbol $\overline{\Delta \rho}$ is used here to represent a vector of range measurements, which should not be confused with the range difference vector, $\Delta \bar{\rho}$, of Eq. (33).

Using the pseudo-inverse of the line of sight matrix, H, the covariance of position with respect to the range measurements is $$\text{cov(position)} = E(\Delta \bar{x} \cdot \Delta \bar{x}^T) = \{(H^T H)^{-1} H^T\} E[\overline{\Delta \rho} \cdot \overline{\Delta \rho}^T] \{(H^T H)^{-1} H^T\}^T \tag{94}$$

With the relationship between the range measurement and the phase measurement as established in Eq. (44), the position covariance can also be expressed from the phase measurement expectation as, $$\text{cov(position)} = \{(H^T H)^{-1} H^T\} E[\overline{\lambda \Delta \Phi} \cdot \overline{\lambda \Delta \Phi}^T] \{(H^T H)^{-1} H^T\}^T, \tag{95}$$

where $\overline{\lambda \Delta \Phi}$ is the vector of phase measurements and their cycle wavelengths.

Unlike the GPS system, which assumes the same variance for each range measurement, computations based on measurements from individual pulsars are assumed to have a respective difference accuracy, thus each measurement will have a different variance. This is primarily due to the unique pulse cycle length and timing model for each pulsar. However, these measurements are assumed to be uncorrelated, with zero mean, such that $E[\Delta \rho_i \cdot \Delta \rho_j] = 0$; $i \neq j$. Thus the covariance matrix for the range measurements can be expressed as the diagonal matrix:

$$E[\overline{\Delta \rho} \cdot \overline{\Delta \rho}^T] = \begin{bmatrix} \sigma_{\rho_1}^2 & 0 & \cdots & 0 \\ 0 & \sigma_{\rho_2}^2 & \cdots & 0 \\ \vdots & \vdots & \ddots & \vdots \\ 0 & 0 & \cdots & \sigma_{\rho_k}^2 \end{bmatrix} \tag{96}$$

Similarly, the covariance matrix for phase can be represented as $$E[\overline{\lambda \Delta \Phi} \cdot \overline{\lambda \Delta \Phi}^T] = \begin{bmatrix} \lambda_1^2 \sigma_{\Phi_1}^2 & 0 & \cdots & 0 \\ 0 & \lambda_2^2 \sigma_{\Phi_2}^2 & \cdots & 0 \\ \vdots & \vdots & \ddots & \vdots \\ 0 & 0 & \cdots & \lambda_j^2 \sigma_{\Phi_k}^2 \end{bmatrix} \tag{97}$$

The values of each variance correspond to the accuracy of the measured pulsar pulse arrival time, as well as dependence on the cycle period and the pulse width.

Each pulsar typically emits modulated radiation having a unique variance. However, certain embodiments of the invention assume a constant variance for each measurement. The position covariance is then simplified to either, $$\text{cov(position)} = \{(H^T H)^{-1} H^T\} E[\overline{\Delta \rho} \cdot \overline{\Delta \rho}^T] \{(H^T H)^{-1} H^T\}^T \tag{98}$$
$$= \sigma_\rho^2 (H^T H)^{-1}$$

or, in terms of phase, $$\text{cov(position)} = \{(H^T H)^{-1} H^T\} E[\overline{\lambda \Delta \Phi} \cdot \overline{\lambda \Delta \Phi}^T] \{(H^T H)^{-1} H^T\}^T \tag{99}$$
$$= \sigma_\Phi^2 \text{diag}(\lambda_1^2, \lambda_2^2, \ldots, \lambda_j^2)(H^T H)^{-1}.$$

Note that this simplification relies on the symmetric matrix identity of $(H^T H)^{-1} = \{(H^T H)^{-1}\}^T$. However, since pulsars are very unique and no two pulsars emit the same signal, the assumption of constant variance has only limited applicability. In most applications, specific variances for each range are considered as in Eq. (96) and as phase in Eq. (97).

If spacecraft clock error is also considered to be observable from the pulsar range measurements, then this error can be included in the state vector. In such embodiments, the equation for range measurements can is modified for the additional error as, $$\overline{\Delta \rho} = \begin{bmatrix} \hat{n}_1 & 1 \\ \hat{n}_2 & 1 \\ \vdots & \vdots \\ \hat{n}_j & 1 \end{bmatrix} \begin{bmatrix} \Delta \bar{x} \\ c \delta t_{sc} \end{bmatrix} = H' \Delta \bar{x}' \tag{100}$$

where H' is the modified measurement matrix, and $\Delta \bar{x}'$ is new state vector that includes both spacecraft position and spacecraft clock error. Once the clock error has been determined, it may be used to correct the timing of incoming pulses, thereby providing more accurate navigational data.

From the error equations discussed in the "Measurement Differences" section, any errors could be included in the state vector, as long the correct modifications to the measurement matrix are implemented and these errors are observable. The analysis for position covariance described above is, implemented using this new model equation of Eq. (100). Alternatively, phase measurements could be utilized instead of range measurements, as presented in previous sections.

XXX. Geometric Dilution of Precision (GDOP)

The Geometric Dilution of Precision (GDOP) is an expression of the accuracy of the estimated position. GDOP is based upon the covariance matrix of the estimated errors of the position solution. This parameter is often used in GPS position accuracy estimates, and some of the algorithms used for GPS may be applied to pulsars, although modifications shown above for the position covariance are required. In the GPS system, the range accuracy from each GPS satellite is often assumed constant, thus the range covariance matrix reduces to a constant multiplied by an identity matrix. The GPS-specific GDOP can then be represented as a scalar quantity. For a pulsar-based system, range measurements to each pulsars are most likely unique to each pulsar, thus the simplification towards a GPS-like system cannot be realized using pulsars. Nonetheless, the position accuracy can still be estimated using the computed variance. The pulsar-based navigation system GDOP is then no longer a scalar value, but rather a direct estimate of position accuracy.

The position covariance matrix of Eq. (98) or (99) are 3×3 matrices, since the state vector is composed of position. This covariance matrix can be represented as $$\text{cov(position)} = E(\Delta \bar{x} \cdot \Delta \bar{x}^T) \quad (101)$$

$$= C$$

$$= \begin{bmatrix} \sigma_x^2 & \sigma_x\sigma_y & \sigma_x\sigma_z \\ \sigma_y\sigma_x & \sigma_y^2 & \sigma_y\sigma_z \\ \sigma_z\sigma_x & \sigma_z\sigma_y & \sigma_z^2 \end{bmatrix}.$$

The GDOP is, in certain embodiments of the invention, computed from the trace of this matrix. With this representation, a GDOP from a pulsar-based system has units of position (km), not a simple scalar quantity as in GPS, $$\text{GDOP}_{PSR} = \sqrt{\text{trace}(C)} = \sqrt{\sigma_x^2 + \sigma_y^2 + \sigma_z^2}. \quad (102)$$

In some embodiments of the invention, the error state covariance matrix includes spacecraft clock error, as shown in Eq. (100), and the covariance matrix is represented by, $$\text{cov(position)} = E(\Delta \bar{x}' \cdot \Delta \bar{x}'^T) \quad (103)$$

$$= C'$$

$$= \begin{bmatrix} \sigma_x^2 & \sigma_x\sigma_y & \sigma_x\sigma_z & \sigma_x\sigma_t \\ \sigma_y\sigma_x & \sigma_y^2 & \sigma_y\sigma_z & \sigma_y\sigma_t \\ \sigma_z\sigma_x & \sigma_z\sigma_y & \sigma_z^2 & \sigma_z\sigma_t \\ \sigma_t\sigma_x & \sigma_t\sigma_y & \sigma_t\sigma_z & \sigma_t^2 \end{bmatrix}.$$

The GDOP for a system so embodied is again based upon the trace of the covariance matrix, but this now includes the variance due to clock error, $$\text{GDOP}_{PSR} = \sqrt{\text{trace}(C')} = \sqrt{\sigma_x^2 + \sigma_y^2 + \sigma_z^2 + \sigma_t^2}. \quad (104)$$

The position dilution of precision (PDOP) can be determined from this system by considering only the position related states as $$\text{PDOP}_{PSR} = \sqrt{\text{trace}(C'_{3\times 3})} = \sqrt{\sigma_x^2 + \sigma_y^2 + \sigma_z^2}. \quad (105)$$

The time dilution of precision (TDOP) is directly computed by the time variance in this matrix and also has units of position (km), $$\text{TDOP}_{PSR} = \sigma_t. \quad (106)$$

The measured GDOP provides a description of how well the set of chosen pulsars will compute an accurate three-dimensional position. If pulsars are chosen from only one portion of the sky, the measurement matrix will skew the observations towards this direction and will not produce a good three-dimensional solution. If pulsars are chosen that are sufficiently distributed over the sky, then direction will not be biased by the measurement matrix and a good three-dimensional solution will result. Lower values of GDOP indicate more favorable pulsar distribution. Thus various sets of pulsars can be chosen and their associated GDOP will determine which is the more appropriate set for processing. In certain embodiments of the present invention, the GDOP value provides a parameter for choosing pulsars for the Batch resolution process, since a good distribution of pulsars improves this solution.

Although this invention has been described in connection with specific forms and embodiments thereof, it will be appreciated that various modifications other than those discussed above may be resorted to without departing from the spirit or scope of the invention. For example, functionally equivalent elements may be substituted for those specifically shown and described, and in the method steps described, particular steps may be reversed or interposed, all without departing from the spirit or scope of the invention as defined in the appended Claims.

What is claimed is:

1. A method for determining navigational data using modulated celestial radiation, the method comprising the steps of:

selecting a localized reference point in a reference frame;

receiving modulated radiation at a reception point in said reference frame from at least one celestial source, said reception point located an unknown distance from said reference point, each said source located along a line in a corresponding known direction with respect to said reference point;

generating for each said source a signal from said received modulated radiation, said signal characterized by a modulation characteristic of said source;

generating from each said signal a time of arrival signal, said time of arrival signal indicative of a time of reception of a first state of said modulation characteristic;

estimating at said reception point from each said time of arrival signal a second state of said modulation characteristic, said second state of said modulation characteristic corresponding to said modulation characteristic at said reference point at said time of reception; and determining at least one navigational parameter at said reception point relative to said reference point from each said first state and each said second state;

where said modulated radiation receiving step includes the step of receiving said modulated radiation from a plurality of said sources; and, where said navigational parameter determining step includes the steps of:

establishing as said first modulation state for each of said sources a first phase corresponding to a phase of said modulation characteristic at said reception point and establishing as said second modulation state for each of said sources a second phase corresponding to said phase of said modulation characteristic at said reference point;

calculating a plurality of phase differences for said reception point, each of said phase differences corresponding to a respective one of said plurality of sources and calculated as a difference between said first phase and said second phase; and determining from a relationship between said plurality of phase differences a location in three-dimensional space of said reception point relative to said reference point.

2. The method for determining navigational data using modulated celestial radiation as recited in claim 1, where said location determining step includes the steps of:

establishing as said relationship a set of equations from said plurality of phase differences; and solving said set of equations to determine said location.

3. The method for determining navigational data using modulated celestial radiation as recited in claim 2, where said equation solving step includes the step of solving said set of equations using a least squares algorithm.

4. The method for determining navigational data using modulated celestial radiation as recited in claim 1, where said location determining step includes the steps of:

establishing as said relationship a state space wherein at least one state is said location in three-dimensional space of said reception point relative to said reference point;

forming a statistical filter based on said state space;

providing said plurality of phase differences to said filter;

providing at an output of said filter an update of said location;

repeating said method at said phase differences providing step until said location update corresponds to a predetermined convergence criteria; and providing as said location said update.

5. The method for determining navigational data using modulated celestial radiation as recited in claim 4, where said filter providing step includes the step of providing a Kalman filter as said statistical filter and said method repeating step includes the step of choosing at least one value of an error covariance matrix of said Kalman filter as said convergence criteria.

6. The method for determining navigational data using modulated celestial radiation as recited in claim 1, where said location determining step includes the steps of:

selecting a search space that includes said reception point, said search space including a set of candidate locations, each of said candidate locations respectively characterized by a plurality of phase differences, each of said phase differences corresponding to a phase difference between a modulated radiation phase of a corresponding one of said sources at said corresponding candidate location and said modulated radiation phase of said corresponding one of said sources at said reference point; and determining from said set of candidate locations a location at which said set of phase differences is equivalent to within a predetermined threshold to said plurality of phase differences for said reception point.

7. The method for determining navigational data using modulated celestial radiation as recited in claim 1, where said navigational parameter determining step further includes the steps of:

forming a set of phase double differences for said reception point, each of said phase double differences calculated as a difference between a first phase difference corresponding to one of said sources and a second phase difference from another one of said sources; and determining from a relationship between said phase double differences said location in three-dimensional space of said reception point relative to said reference point.

8. The method for determining navigational data using modulated celestial radiation as recited in claim 7, where said navigational parameter determining step further includes the steps of:

forming a set of phase triple differences for said reception point, each of said phase triple differences calculated as a difference between a first phase double difference corresponding to a first time epoch and a second phase double difference corresponding to a second time epoch; and determining from a relationship between said phase triple differences said location in three-dimensional space of said reception point relative to said reference point.

9. The method for determining navigational data using modulated celestial radiation as recited in claim 8, where said navigational parameter determining step further includes the step of determining from a relationship between said phase triple differences a velocity corresponding to said reception point.

10. A method for determining navigational data using modulated celestial radiation, the method comprising the steps of:

selecting a localized reference point in a reference frame;

receiving modulated radiation at a reception point in said reference frame from at least one celestial source, said reception point located an unknown distance from said reference point, each said source located along a line in a corresponding known direction with respect to said reference point;

generating for each said source a signal from said received modulated radiation, said signal characterized by a modulation characteristic of said source;

generating from each said signal a time of arrival signal, said time of arrival signal indicative of a time of reception of a first state of said modulation characteristic;

estimating at said reception point from each said time of arrival signal a second state of said modulation characteristic, said second state of said modulation characteristic corresponding to said modulation characteristic at said reference point at said time of reception; and determining at least one navigational parameter at said reception point relative to said reference point from each said first state and each said second state;

where said navigational parameter determining step includes the steps of:

establishing as said first modulation state for a single source a first phase equivalent to a phase of said modulation characteristic at said reception point and establishing as said second modulation state for said source a second phase equivalent to said phase of said modulation characteristic at said reference point;

calculating at a first time epoch a phase difference between said first phase and said second phase corresponding to each said source;

calculating at a second time epoch said phase difference; and calculating from said phase difference at said first time epoch and said phase difference at said second time epoch a velocity of said reception point.

11. The method for determining navigational data using modulated celestial radiation as recited in claim 10, where said modulated radiation receiving step includes the step of receiving said modulated radiation from a plurality of said sources.

12. A method for determining navigational data using modulated celestial radiation, the method comprising the steps of:

providing a timer at a displaceable reception point, said timer operable to generate a timing signal indicative of a proper time of reception of a modulation characteristic;

selecting a localized reference point in a reference frame;

receiving modulated radiation at said reception point in said reference frame from at least one celestial source located along a line in a known direction with respect to said reference point;

generating from said received modulated radiation at least one signal characterized by a corresponding modulation characteristic of said at least one source;

generating via said timer time of arrival signals responsive to a state of said modulation characteristic of each said signal;

transferring said time of arrival signals to said reference point to produce corresponding coordinate time of arrival signals;

estimating from said coordinate time of arrival signals corresponding coordinate times of arrival of said corresponding modulation characteristic at said reference point; and determining at least one navigational parameter relative to said reference point from said coordinate time of arrival signals and said corresponding estimated coordinate times of arrival;

where said modulated radiation receiving step includes the step of receiving said modulated radiation from a plurality of said sources; and said navigational parameter determining step includes the steps of:

determining from said timing signals a corresponding first phase equivalent to a phase of said modulation characteristic of a corresponding one of said plurality of sources at said reception point;

determining from said estimated times of arrival a second phase equivalent to said phase of said modulation characteristic of a corresponding one of said plurality of sources at said reference point;

calculating a plurality of phase differences for said reception point, each of said phase differences corresponding to a respective one of said plurality of sources and calculated as a difference between said first phase and said second phase; and determining from a relationship between said plurality of phase differences a location in three-dimensional space of said reception point relative to said reference point.

13. The method for determining navigational data using modulated celestial radiation as recited in claim 12, where said location determining step includes the steps of:

establishing as said relationship a state space wherein at least one state is said location in three-dimensional space of said reception point relative to said reference point and another state is an error distance;

forming a statistical filter based on said state space;

providing said plurality of phase differences to said filter;

providing at an output of said filter an update of said location and an update of said error distance;

repeating said method at said phase differences providing step until said location update and said error distance update correspond to a predetermined convergence criteria; and providing as said location said location update.

14. The method for determining navigational data using modulated celestial radiation as recited in claim 13, where said filter providing step includes the step of providing a Kalman filter as said statistical filter and said method repeating step includes the step of choosing at least one value of an error covariance matrix of said Kalman filter as said convergence criteria.

15. The method for determining navigational data using modulated celestial radiation as recited in claim 13 further including the step of providing said error distance update from said filter subsequent to said predetermined convergence criteria being met in said method repeating step, said error distance being proportional to a timer error.

16. The method for determining navigational data using modulated celestial radiation as recited in claim 15 further including the step of modifying said time of arrival signals by said timer error.

* * * * *